US011748687B2

(12) United States Patent
Gray et al.

(10) Patent No.: US 11,748,687 B2
(45) Date of Patent: Sep. 5, 2023

(54) DYNAMICALLY GENERATING VISUALIZATION DATA BASED ON SHIPPING EVENTS

(71) Applicant: eBay Inc., San Jose, CA (US)

(72) Inventors: Douglas Bradley Gray, Portland, OR (US); Constanza Maria Heath, Cannon Beach, OR (US)

(73) Assignee: eBay Inc., San Jose, CA (US)

( * ) Notice: Subject to any disclaimer, the term of this patent is extended or adjusted under 35 U.S.C. 154(b) by 389 days.

(21) Appl. No.: 16/454,996

(22) Filed: Jun. 27, 2019

(65) Prior Publication Data

US 2020/0311665 A1 Oct. 1, 2020

Related U.S. Application Data

(60) Provisional application No. 62/825,710, filed on Mar. 28, 2019.

(51) Int. Cl.
*G06Q 10/08* (2023.01)
*G06Q 10/0832* (2023.01)
(Continued)

(52) U.S. Cl.
CPC ..... *G06Q 10/0832* (2013.01); *G06F 16/1824* (2019.01); *G06F 16/2379* (2019.01);
(Continued)

(58) Field of Classification Search
CPC .................................. G06K 19/0717
See application file for complete search history.

(56) References Cited

U.S. PATENT DOCUMENTS 5,831,860 A 11/1998 Foladare et al.
7,130,771 B2 10/2006 Aghassipour
(Continued)

FOREIGN PATENT DOCUMENTS

CN 202979284 U 6/2013
CN 103258359 A 8/2013
(Continued)

OTHER PUBLICATIONS

Saberi, Sara, et al. "Blockchain technology and its relationships to sustainable supply chain management." International Journal of Production Research 57.7 (2019): 2117-2135. (Year: 2019).*
(Continued)

*Primary Examiner* — Daniel Vetter
*Assistant Examiner* — Christopher Gomez
(74) *Attorney, Agent, or Firm* — Fig. 1. Patents

(57) ABSTRACT

Technologies are described for generating visualizations that graphically represent an item being exposed to extreme environmental conditions while en route to a destination. An exemplary visualization may include a still graphic that shows a symbol of a detected environmental condition positioned adjacent to and/or superimposed over a graphic that represents the item. Another exemplary visualization may include an animation that includes a sequence of frames that, when sequentially displayed at a particular frame rate, animate the item being subjected to the detected environmental condition. Various implementations include receiving measurements of the environmental conditions that the item is exposed to from sensors that are proximate to the item while it is en route to the destination. Then, when thresholds are reached for specific environmental conditions (e.g., temperature, acceleration, etc.), visualizations may be generated that graphically represent the item being exposed to such specific environmental conditions.

20 Claims, 16 Drawing Sheets

(51) Int. Cl.

| | |
|---|---|
| *G06Q 10/0833* | (2023.01) |
| *G06Q 10/0835* | (2023.01) |
| *H04L 9/06* | (2006.01) |
| *G06K 19/07* | (2006.01) |
| *G06F 16/182* | (2019.01) |
| *G06Q 20/38* | (2012.01) |
| *G06Q 50/28* | (2012.01) |
| *G06K 7/14* | (2006.01) |
| *H04L 9/32* | (2006.01) |
| *G06F 16/23* | (2019.01) |
| *G06F 16/955* | (2019.01) |
| *G06Q 20/40* | (2012.01) |
| *G06Q 30/08* | (2012.01) |
| *H04L 9/08* | (2006.01) |
| *G06Q 10/0834* | (2023.01) |
| *G06Q 30/0283* | (2023.01) |
| *H04L 9/00* | (2022.01) |

(52) U.S. Cl.
CPC ......... *G06F 16/955* (2019.01); *G06K 7/1408* (2013.01); *G06K 19/0717* (2013.01); *G06Q 10/0833* (2013.01); *G06Q 10/0835* (2013.01); *G06Q 10/08345* (2013.01); *G06Q 10/08355* (2013.01); *G06Q 20/382* (2013.01); *G06Q 20/3825* (2013.01); *G06Q 20/4014* (2013.01); *G06Q 30/0283* (2013.01); *G06Q 30/08* (2013.01); *G06Q 50/28* (2013.01); *H04L 9/0637* (2013.01); *H04L 9/0643* (2013.01); *H04L 9/0869* (2013.01); *H04L 9/3242* (2013.01); *H04L 9/3263* (2013.01); *H04L 9/50* (2022.05)

(56) References Cited

U.S. PATENT DOCUMENTS

| | | | |
|---|---|---|---|
| 7,624,024 B2 | 11/2009 | Levis et al. | |
| 7,647,231 B2 | 1/2010 | Kuebert et al. | |
| 8,412,489 B2 | 4/2013 | Kadaba | |
| 9,436,923 B1 | 9/2016 | Sriram et al. | |
| 9,760,854 B1 | 9/2017 | Chowdhary | |
| 9,767,426 B2 | 9/2017 | Siegel et al. | |
| 9,830,571 B2 | 11/2017 | Betancourt | |
| 9,849,364 B2 | 12/2017 | Tran et al. | |
| 9,857,188 B1 | 1/2018 | O'hare et al. | |
| 10,102,526 B1 | 10/2018 | Madisetti et al. | |
| 10,643,171 B1 | 5/2020 | Zhang | |
| 10,721,060 B1 | 7/2020 | Kaizer et al. | |
| 11,468,390 B2 | 10/2022 | Sanskaran et al. | |
| 11,651,321 B2 | 5/2023 | Sankaran et al. | |
| 2002/0165729 A1 | 11/2002 | Kuebert et al. | |
| 2003/0125963 A1 | 6/2003 | Haken | |
| 2003/0163378 A1 | 8/2003 | Podgumy et al. | |
| 2003/0173405 A1 | 9/2003 | David et al. | |
| 2004/0254893 A1 | 12/2004 | Tsuei et al. | |
| 2005/0052284 A1 | 3/2005 | Schmidtberg et al. | |
| 2005/0259658 A1 | 11/2005 | Logan et al. | |
| 2006/0282277 A1 | 12/2006 | Ng | |
| 2007/0210916 A1 | 9/2007 | Ogushi et al. | |
| 2008/0052044 A1 | 2/2008 | Shoenfeld | |
| 2008/0111674 A1 | 5/2008 | Quine | |
| 2009/0303052 A1 | 12/2009 | Aklepi et al. | |
| 2010/0164686 A1 | 7/2010 | Johnson | |
| 2010/0299640 A1* | 11/2010 | Titus ...................... G06N 3/006 715/848 |
| 2011/0258130 A1 | 10/2011 | Grabiner | |
| 2012/0023555 A1 | 1/2012 | Putterman | |
| 2012/0106859 A1* | 5/2012 | Cheatle ................ H04N 1/3872 382/224 |
| 2012/0173448 A1 | 7/2012 | Rademaker | |
| 2012/0235791 A1 | 9/2012 | Donlan et al. | |
| 2014/0035721 A1 | 2/2014 | Heppe et al. | |
| 2014/0180959 A1 | 6/2014 | Gillen et al. | |
| 2014/0244537 A1 | 8/2014 | Jani et al. | |
| 2014/0266712 A1* | 9/2014 | Bobo ...................... G06Q 10/08 340/539.26 |
| 2014/0372334 A1 | 12/2014 | Wrentmore | |
| 2014/0379603 A1 | 12/2014 | Bodenhamer et al. | |
| 2015/0046361 A1 | 2/2015 | Williams et al. | |
| 2015/0046364 A1 | 2/2015 | Kriss | |
| 2015/0154559 A1 | 6/2015 | Barbush et al. | |
| 2015/0382085 A1 | 12/2015 | Lawrie-Fussey et al. | |
| 2016/0042317 A1* | 2/2016 | Goodman .......... G06Q 10/0833 705/341 |
| 2016/0063433 A1 | 3/2016 | Glasgow et al. | |
| 2016/0098730 A1 | 4/2016 | Feeney | |
| 2016/0260059 A1 | 9/2016 | Benjamin et al. | |
| 2016/0350712 A1 | 12/2016 | Wesemann et al. | |
| 2017/0109696 A1 | 4/2017 | Serjeantson et al. | |
| 2017/0121021 A1 | 5/2017 | Bonazzoli et al. | |
| 2017/0147976 A1 | 5/2017 | Koch et al. | |
| 2017/0180128 A1 | 6/2017 | Lu | |
| 2017/0180134 A1 | 6/2017 | King | |
| 2017/0221052 A1 | 8/2017 | Sheng et al. | |
| 2017/0229000 A1* | 8/2017 | Law ...................... G01K 1/024 |
| 2017/0243213 A1 | 8/2017 | Castinado et al. | |
| 2017/0257358 A1 | 9/2017 | Ebrahimi et al. | |
| 2017/0262790 A1 | 9/2017 | Khasis | |
| 2017/0270472 A1* | 9/2017 | High ................... G06Q 10/087 |
| 2017/0286901 A1* | 10/2017 | Skaff .................. H04N 5/23238 |
| 2017/0329980 A1 | 11/2017 | Hu et al. | |
| 2017/0344988 A1 | 11/2017 | Cusden et al. | |
| 2018/0024554 A1* | 1/2018 | Brady ................ G06Q 10/0837 701/23 |
| 2018/0096175 A1 | 4/2018 | Schmeling et al. | |
| 2018/0097635 A1 | 4/2018 | Moses | |
| 2018/0158020 A1 | 6/2018 | Khasis | |
| 2018/0167198 A1 | 6/2018 | Muller et al. | |
| 2018/0174093 A1 | 6/2018 | Perez | |
| 2018/0174097 A1 | 6/2018 | Liu et al. | |
| 2018/0174157 A1 | 6/2018 | Endress et al. | |
| 2018/0220278 A1 | 8/2018 | Tal et al. | |
| 2018/0232693 A1 | 8/2018 | Gillen et al. | |
| 2018/0253691 A1 | 9/2018 | High et al. | |
| 2018/0255131 A1 | 9/2018 | Stöcker et al. | |
| 2018/0264347 A1 | 9/2018 | Tran et al. | |
| 2018/0276611 A1 | 9/2018 | Dromerhauser et al. | |
| 2018/0343114 A1 | 11/2018 | Ben-Ari | |
| 2018/0349896 A1 | 12/2018 | Arora et al. | |
| 2019/0006037 A1 | 1/2019 | Jacobs et al. | |
| 2019/0012637 A1 | 1/2019 | Gillen | |
| 2019/0014116 A1 | 1/2019 | Khi et al. | |
| 2019/0019144 A1 | 1/2019 | Gillen | |
| 2019/0034863 A1 | 1/2019 | Winkle et al. | |
| 2019/0036932 A1 | 1/2019 | Bathen et al. | |
| 2019/0043001 A1 | 2/2019 | Woulfe et al. | |
| 2019/0102735 A1 | 4/2019 | Barton et al. | |
| 2019/0114714 A1* | 4/2019 | Jones ...................... G06Q 40/08 |
| 2019/0164241 A1 | 5/2019 | Bässler et al. | |
| 2019/0197531 A1 | 6/2019 | Peenikal et al. | |
| 2019/0205898 A1 | 7/2019 | Greco et al. | |
| 2019/0266550 A1 | 8/2019 | Santosh et al. | |
| 2019/0293443 A1 | 9/2019 | Kelly et al. | |
| 2019/0303852 A1* | 10/2019 | Chopko ............ G06Q 10/0832 |
| 2019/0333130 A1 | 10/2019 | Jha et al. | |
| 2020/0005240 A1* | 1/2020 | Ko ...................... G06Q 10/047 |
| 2020/0042933 A1* | 2/2020 | Jurich, Jr. ................ G06N 3/08 |
| 2020/0052880 A1 | 2/2020 | Bathen et al. | |
| 2020/0118086 A1 | 4/2020 | Achkir | |
| 2020/0125269 A1 | 4/2020 | Karame et al. | |
| 2020/0142739 A1 | 5/2020 | Chan et al. | |
| 2020/0211000 A1 | 7/2020 | Narasimhan | |
| 2020/0244470 A1 | 7/2020 | Ruckriemen et al. | |
| 2020/0265516 A1 | 8/2020 | Xu | |
| 2020/0311666 A1 | 10/2020 | Gray et al. | |
| 2020/0311670 A1 | 10/2020 | Sankaran et al. | |
| 2020/0311675 A1 | 10/2020 | Sankaran et al. | |
| 2020/0311676 A1 | 10/2020 | Smith, Jr. | |
| 2020/0313897 A1 | 10/2020 | Heath et al. | |
| 2020/0313903 A1 | 10/2020 | Yu | |
| 2021/0272049 A1 | 9/2021 | Gillen et al. | |

(56) References Cited

U.S. PATENT DOCUMENTS

2022/0108266 A1  4/2022 Smith et al.
2022/0351125 A1  11/2022 Sankaran et al.
2022/0391831 A1  12/2022 Heath et al.
2023/0059581 A1  2/2023 Sankaran et al.

FOREIGN PATENT DOCUMENTS

| CN | 107730279 A | 2/2018 |
|---|---|---|
| EP | 3296974 A1 | 3/2018 |
| EP | 3640872 A1 | 4/2020 |
| JP | 2003534582 A6 | 7/2004 |
| WO | 2013/002748 A1 | 1/2013 |
| WO | 2013002748 A1 | 1/2013 |
| WO | 2015/021482 A1 | 2/2015 |
| WO | 2017/127564 A1 | 7/2017 |
| WO | 2018/099920 A1 | 6/2018 |
| WO | 2020/096713 A1 | 5/2020 |
| WO | 2020/197639 A1 | 10/2020 |
| WO | 2020/197640 A1 | 10/2020 |
| WO | 2020/197642 A1 | 10/2020 |
| WO | 2020/197683 A1 | 10/2020 |

OTHER PUBLICATIONS

International Search Report received for PCT Application No. PCT/US2019/053815, dated Nov. 22, 2019, 4 pages.
International Search Report received for PCT Application No. PCT/US2020/016450, dated Apr. 20, 2020, 4 pages.
International Search Report received for PCT Application No. PCT/US2020/016453, dated Apr. 21, 2020, 3 pages.
International Search Report received for PCT Application No. PCT/US2020/019976, dated Apr. 23, 2020, 3 pages.
International Written Opinion received for PCT Application No. PCT/US2019/053815, dated Nov. 22, 2019, 6 pages.
International Written Opinion received for PCT Patent Application No. PCT/US2020/019976, dated Apr. 23, 2020, 5 pages.
Written Opinion received for PCT Patent Application No. PCT/US2020/016450, dated Apr. 20, 2020, 6 pages.
Written Opinion received for PCT Patent Application No. PCT/US2020/016453, dated Apr. 21, 2020, 7 pages.
Zhang et al., "FHIRChain: Applying Blockchain to Securely and Scalably Share Clinical Data", Retrieved from the internet: <https://www.sciencedirect.com/science/article/pii/S2001037018300370>, Jul. 29, 2018, pp. 267-278.
Non-Final Office Action received for U.S. Appl. No. 16/384,362, dated Nov. 5, 2020, 18 pages.
Boudguiga et al., "Towards Better Availability and Accountability for IoT Updates by means of a Blockchain", 2017 IEEE European Symposium on Security and Privacy Workshops (EuroS&PW), Apr. 2017, pp. 50-58.
Hanhaa, "Make an Example of Hanhaa's Parcelive—How Else Can It Be Used?", Retrieved from the Internet URL: <https://hanhaa.com/make-an-example-of-hanhaas-parcelive-how-else-can-it-be-used/?, Jun. 17, 2019, 5 pages.
Final Office Action received for U.S. Appl. No. 14/471,420, dated Jun. 17, 2020, 15 pages.
International Search Report received for PCT Application No. PCT/US2020/016680, dated Apr. 24, 2020, 4 Pages.
Written Opinion received for PCT Patent Application No. PCT/US2020/016680, dated Apr. 24, 2020, 6 Pages.
Final Office Action Received for U.S. Appl. No. 14/471,420, dated Jun. 18, 2021, 16 Pages.
Non-Final Office Action received for U.S. Appl. No. 14/471,420, dated Jan. 28, 2021, 17 Pages.
Non Final Office Action Received for U.S. Appl. No. 16/455,284, dated Mar. 31, 2021, 19 Pages.
Non Final Office Action Received for U.S. Appl. No. 16/457,056, dated Apr. 21, 2021, 28 pages.
Non-Final Office Action received for U.S. Appl. No. 16/458,645, dated Apr. 5, 2021, 31 Pages.

Aitawy et al., "Lelantos: A Blockchain-based Anonymous Physical Delivery System", 2017 15th Annual Conference on Privacy, Security and Trust, (Year: 2017), 2017, 12 pages.
Boudguiga et al., "Towards Better Availability and Accountability for IoT Updates by Means of a Blockchain", 2017 IEEE European Symposium on Security and Privacy Workshops (EUROS&PW), Apr. 1, 2017, 5 pages.
Hasan et al., "Blockchain-Based Proof of Delivery of Physical Assets With Single and Multiple Transporters", Aug. 21, 2018, IEEE vol. 6, 2018, p. 46781-46793, 13 Pages.
Advisory Action received for U.S. Appl. No. 14/471,420, dated May 31, 2018, 3 pages.
Applicant Initiated Interview Summary received for U.S. Appl. No. 14/471,420, dated Apr. 6, 2020, 3 pages.
Applicant Initiated Interview Summary received for U.S. Appl. No. 14/471,420, dated Nov. 13, 2017, 3 pages.
Final Office Action received for U.S. Appl. No. 14/471,420, dated Aug. 6, 2019, 15 pages.
Final Office Action received for U.S. Appl. No. 14/471,420, dated Mar. 15, 2018, 18 pages.
Non Final Office Action received for U.S. Appl. No. 14/471,420, dated Feb. 7, 2020, 20 pages.
Non-Final Office Action received for U.S. Appl. No. 14/471,420, dated Sep. 11, 2017, 15 pages.
Non-Final Office Action received for U.S. Appl. No. 14/471,420, dated Feb. 26, 2019, 18 pages.
Response to Advisory Action filed on Aug. 15, 2018, for U.S. Appl. No. 14/471,420, dated May 31, 2018, 13 pages.
Response to Final Office Action filed on May 21, 2018, for U.S. Appl. No. 14/471,420, dated Mar. 15, 2018, 15 pages.
Response to Final Office Action filed on Sep. 30, 2019, for U.S. Appl. No. 14/471,420, dated Aug. 6, 2019, 11 pages.
Response to Non-Final Office Action filed on Jan. 11, 2018, for U.S. Appl. No. 14/471,420, dated Sep. 11, 2017, 14 pages.
Response to Non-Final Office Action filed on Jun. 3, 2019, for U.S. Appl. No. 14/471,420, dated Feb. 26, 2019, 20 pages.
Response to Non-Final Office Action filed on May 7, 2020, for U.S. Appl. No. 14/471,420, dated Feb. 7, 2020, 11 pages.
Non Final Office Action received for U.S. Appl. No. 14/471,420, dated Jan. 7, 2022, 18 pages.
Non-Final Office Action received for U.S. Appl. No. 16/455,170, dated Feb. 1, 2022, 19 pages.
Non Final Office Action received for U.S. Appl. No. 16/457,056, dated Dec. 14, 2021, 34 pages.
Non-Final Office Action received for U.S. Appl. No. 16/457,248, dated Feb. 3, 2022, 14 pages.
Final Office Action received for U.S. Appl. No. 16/455,284, dated Sep. 7, 2021, 20 pages.
Final Office Action received for U.S. Appl. No. 16/457,056, dated Sep. 8, 2021, 30 pages.
Final Office Action Received for U.S. Appl. No. 16/458,645, dated Sep. 28, 2021, 35 pages.
International Preliminary Report on Patentability Received for PCT Application No. PCT/US2020/016450, dated Oct. 7, 2021, 8 Pages.
International Preliminary Report on Patentability received for PCT Application No. PCT/US2020/016453, dated Oct. 7, 2021, 9 Pages.
International Preliminary Report on Patentability Received for PCT Application No. PCT/US2020/016680, dated Oct. 7, 2021, 8 Pages.
International Preliminary Report on Patentability received for PCT Application No. PCT/US2020/019976, dated Oct. 7, 2021, 7 pages.
"Final Office Action", U.S. Appl. No. 16/457,056, dated May 10, 2022, 41 pages.
"Notice of Allowance", U.S. Appl. No. 16/457,248, dated May 12, 2022, 8 pages.
U.S. Appl. No. 16/455,284 , "Notice of Allowance received for U.S. Appl. No. 16/455,284, dated Feb. 22, 2022", Feb. 22, 2022, 12 Pages.
U.S. Appl. No. 16/455,284 , "Supplemental Notice of Allowability Received for U.S. Appl. No. 16/455,284, dated Mar. 9, 2022", Mar. 9, 2022, 2 Pages.
U.S. Appl. No. 16/458,645, "Non-Final Office Action", U.S. Appl. No. 16/458,645, dated Apr. 15, 2022, 33 pages.

(56) References Cited

OTHER PUBLICATIONS

U.S. Appl. No. 14/471,420, "Advisory Action received for U.S. Appl. No. 14/471,420 dated Aug. 1, 2022", Aug. 1, 2022, 3 Pages.
U.S. Appl. No. 14/471,420, "Final Office Action", U.S. Appl. No. 14/471,420, dated May 20, 2022, 17 pages.
U.S. Appl. No. 16/455,170, "Final Office Action", U.S. Appl. No. 16/455,170, dated Jul. 13, 2022, 19 pages.
U.S. Appl. No. 16/455,284, "Supplemental Notice of Allowability", U.S. Appl. No. 16/455,284, dated Jun. 3, 2022, 2 pages.
U.S. Appl. No. 16/457,248, "Corrected Notice of Allowability", U.S. Appl. No. 16/457,248, dated May 25, 2022, 6 pages.
U.S. Appl. No. 16/458,645, "Notice of Allowance received for U.S. Appl. No. 16/458,645, dated Jun. 21, 2022", Jun. 21, 2022, 10 pages.
U.S. Appl. No. 16/455,170, "Non-Final Office Action", U.S. Appl. No. 16/455,170, dated Sep. 14, 2022, 21 pages.
U.S. Appl. No. 16/457,248, "Corrected Notice of Allowability", U.S. Appl. No. 16/457,248, dated Aug. 24, 2022, 2 pages.
U.S. Appl. No. 16/458,645, "Corrected Notice of Allowability", U.S. Appl. No. 16/458,645, dated Sep. 15, 2022, 2 pages.
U.S. Appl. No. 16/455,170, "Final Office Action", U.S. Appl. No. 16/455,170, dated Jan. 9, 2023, 22 pages.
U.S. Appl. No. 17/893,431, "Non-Final Office Action", U.S. Appl. No. 17/893,431, dated Jan. 3, 2023, 5 pages.
202080022859.6, "Foreign Office Action", CN Application No. 202080022859.6, dated Nov. 4, 2022, 19 pages.
202080024681.9, "Foreign Office Action", CN Application No. 202080024681.9, dated Nov. 2, 2022, 17 pages.
"CryptoTec AG Blockchain for the Automotive Industry", Retrieved from the Internet URL : <https://test.cryptotec.com//wp-content/uploads/2018/01/Blockchain_for_Automotive_CryptoTec_EN.pdf>, Jan. 1, 2018, 5 Pages.
U.S. Appl. No. 16/455,170, "Decision on Pre-Appeal Brief", U.S. Appl. No. 16/455,170, dated Apr. 14, 20230, 2 pages.
U.S. Appl. No. 17/886,947, "Non-Final Office Action", U.S. Appl. No. 17/886,947, dated Apr. 13, 2023, 13 pages.
U.S. Appl. No. 17/893,431, "Corrected Notice of Allowability", U.S. Appl. No. 17/893,431, dated Apr. 19, 2023, 2 pages.
U.S. Appl. No. 17/893,431, "Notice of Allowance", U.S. Appl. No. 17/893,431, dated Mar. 1, 2023, 8 pages.
202080022859.6, "Office Action", CN Application No. 202080022859.6, dated Mar. 8, 2023, 11 pages.
202080024681.9, "Office Action received for Chinese Patent Application No. 202080024681.9, dated Apr. 28 2023", Apr. 28, 2023, 7 Pages.
20709407.9, "Communication Pursuant to Article 94(3) EPC Received for European Patent Application No. 20709407.9, dated Apr. 28, 2023", Apr. 28, 2023, 5 Pages.
U.S. Appl. No. 16/455,170, filed Jun. 15, 2023, "Non-Final Office Action", U.S. Appl. No. 16/455,170, filed Jun. 15, 2023, 25 pages.
20709018.4, "Communication under Rule 71(3)", EP Application No. 20709018.4, May 9, 2023, 9 pages.
20713483.4, "Communication under Rule 71(3)", EP Patent Application No. 20713483.4, May 10, 2023, 8 pages.

* cited by examiner

| Environmental Condition Graphics 112 |||
|---|---|---|
| Environmental Condition | Degree 1 | Degree 2 |
| Pressure |  112(1) |  112(2) |
| Acceleration |  112(3) |  112(4) |
| Humidity |  112(5) |  112(6) |
| Temperature |  112(7) |  112(8) |

| Environmental Condition Graphics 112 ||| 
|---|---|---|
| Environmental Condition | Degree 1 | Degree 2 |
| Temperature Too Hot | *This Item Is At Risk For Heat Damage* XX° F. 112(9)  | *Your Item Has Been Destroyed By Heat* XX° F. 112(10)  |
| Temperature Too Cold | *This Item Is At Risk For Cold Damage* XX° F. 112(11)  | *Your Item Has Been Destroyed By Cold* XX° F. 112(12)  |

| Product Data 104 ||
|---|---|
| Product Graphic 106 | Resistance Data 108 |

| Resistance Data | |
|---|---|
| Pressure Threshold 1 | 5 PSI |
| Pressure Threshold 2 | 15 PSI |
| Acceleration Threshold 1 | 10 M/S$^2$ |
| Acceleration Threshold 2 | 25 M/S$^2$ |
| Humidity Threshold 1 | N/A |
| Humidity Threshold 2 | N/A |
| Temperature Threshold 1 | ≤ 40° F. |
| Temperature Threshold 2 | ≥ 80° F. |

FIGURE 3A

| Product Data 104 ||
|---|---|
| Product Graphic 106 | Resistance Data 108 |
| | Cold Threshold 1 — $\leq 40°$ F. |
| | Cold Threshold 2 — $\leq 32°$ F. |
| | Heat Threshold 1 — $\geq 80°$ F. |
| | Heat Threshold 2 — $\geq 100°$ F. |

FIGURE 3B

ABSTRACT IS NOT HERE

DYNAMICALLY GENERATING VISUALIZATION DATA BASED ON SHIPPING EVENTS

PRIORITY APPLICATION

This application claims the benefit of and priority to U.S. Provisional Application No. 62/825,710, filed Mar. 28, 2019 entitled "Enhanced Data Management for Shipping and Inventory Systems," the entire contents of which are incorporated herein by reference.

BACKGROUND

When shipping an item to a destination location, some shipping services utilize sensors to monitor current locations of the item and even environmental conditions that the item is exposed to while en route to the destination location. For example, a shipping service may pack a GPS sensor with the item and utilize the GPS sensor to monitor locations of the item during shipment. As other examples, the shipping service may utilize various other types of sensors to monitor whether the item is exposed to extreme temperatures, humidity, or even physical impact (e.g., being dropped or kicked). The event data that is generated by the sensors may be uploaded in raw form via cellular networks and then provided to interested parties such as, for example, a purchaser, seller, shipper, insurer, or any other entity having an interest in the item.

Unfortunately, merely receiving the event data in raw form fails to provide any meaningful context of the environmental conditions to which the item has been exposed. For example, even sophisticated persons with significant experience within the shipping industry would not immediately recognize whether specific humidity levels or specific impact acceleration readings are likely to cause damage to the item—especially since shipping personnel frequently have little or no insight as to what types of items they are currently transporting. Thus, transmitting the event data to interested parties in raw form does not efficiently convey to these interested parties what they are truly concerned with—i.e., whether the item was cared for, neglected, or even abused while en route to the destination location. This inefficiency is exacerbated under circumstances where time is of the essence in alleviating harsh environmental conditions. For example, under circumstance where exposure to heat will irreversibly damage an item, it may be useless to receive event data in a raw format that does not immediately convey the urgency with which remediation is needed.

It is with respect to these and other considerations that the following disclosure is made.

SUMMARY

This disclosure provides techniques for dynamically generating visualizations that are graphically representative of environmental conditions that an item is exposed to while en route to a destination location. Generally described, measurements of the environmental conditions that the item is exposed to are taken via one or more sensors that are located proximate to the item while it is en route to the destination location. Then, appropriate visualizations may be generated in response to thresholds being reached for specific environmental conditions that are predefined as being potentially harmful to the item. As a specific example, product data that corresponds to the item may include a graphical representation (e.g., a digital image) of the item and an indication of a threshold temperature above which the item will become damaged. In such an example, in response to the shipper receiving event data indicating that the temperature surrounding the item has risen above the threshold temperature while it is en route, a visualization may be generated that combines a seller's and/or a manufacturer's graphical representation of the item with a shipper's graphical representation of heat exposure. In this way, while the item is en route, visualizations that graphically represent both the item and the specific environmental conditions that the item is exposed to are generated dynamically based on the event data that is collected from the sensors. Then, the visualizations may be presented to interested parties in near real-time when threshold environmental conditions are detected so as to clearly and intuitively show when and how the item is being subjected to harsh shipping conditions.

The disclosed techniques can effectively improve human interaction with computing devices by receiving event data in raw form and identifying instances of the "raw" event data that indicate when an item that is currently undergoing shipment is subjected to specific environmental conditions that exceed predefined threshold levels. Based on the identified instances of "raw" event data, unique graphical visualizations are dynamically generated and/or presented to interested parties. These unique graphical visualizations may be customized to graphically represent both the item being shipped and also the specific environmental conditions that the item is being harshly subjected to. This reduces the time it takes for an interested party to recognize the harsh nature of the detected environmental conditions and may even eliminate the need for these interested parties to conduct any on-line research to determine the specific environmental conditions the item is capable of withstanding. Thus, by improving human-computer interaction with computing devices, the disclosed technologies tangibly improve computing efficiencies with respect to a wide variety of computing resources that would otherwise be wastefully consumed and/or utilized. For example, eliminating the need to conduct the aforementioned on-line research directly results in reduced network bandwidth usage and processing cycles consumed by server(s) that process and respond to online search queries. Still further, measurement and conveyance of sensor data leads to fewer technical errors. For example, if electronics are transported outside of operating conditions, the display of the conditions can lead to avoidance of technical error with respect to use of the electronics. Technical benefits other than those specifically identified herein might also be realized through implementations of the disclosed technologies.

In one illustrative example, a system receives product data associated with an item. The product data may include a graphical representation of the item such as, for example, a digital image of the item taken from an online listing. The product data may also include resistance data that defines a threshold level(s) of one or more environmental conditions that the item may be potentially exposed to before incurring product damage while en route to a destination location. Exemplary environmental conditions may include, but are not limited to, pressure, acceleration, humidity, and temperature. Accordingly, exemplary threshold levels may include, but are not limited to, a pressure-threshold, an acceleration-threshold, a humidity-threshold, or a temperature-threshold. In some embodiments, the resistance data may define different threshold levels for different degrees of a specific environmental condition. For example, suppose that an item may be damaged if subjected to temperatures below a first temperature or above a second temperature. In this example, the resistance data for this item may define a lower temperature-threshold as the first temperature and an upper temperature-threshold as the second temperature—thereby forming a range of acceptable temperatures.

Then, while the item is en route to the destination, the system receives event data from sensors that are located proximate to the item. The event data may indicate measurements of the environmental condition(s) for which threshold level(s) have been defined within the resistance data associated with the item. For example, under circumstances where the resistance data defines the upper temperature-threshold and the lower temperature-threshold, the system may receive temperature data from a temperature sensor. Additionally, or alternatively, under circumstances where the resistance data defines one or more acceleration-thresholds, the system may receive acceleration data from an accelerometer. In some embodiments, the various sensors from which the system receives event data may be packed inside a packaging unit (e.g., a box, an envelope, and/or any other type of packaging unit) with the item. Additionally, or alternatively, the various sensors may be affixed within a cargo area (e.g., a van box) of a vehicle that is transporting the item.

Based on the event data that is received while the item is en route to the destination location, the system determines when measurements that are received for a particular environmental condition exceed the corresponding threshold level defined in the resistance data. For example, the system may determine when a temperature measurement exceeds an upper temperature-threshold that the resistance data defines for the item. In some embodiments, instances of the event data that include measurements exceeding the threshold levels (or all of the event data for that matter) may be recorded in multiple distributed ledgers of a blockchain. A unique blockchain may be created for each item that is shipped. Alternatively, there may be one or more existing blockchains that store event data that is received in association with multiple items. For example, one shipping provider may have its own blockchain for recording data received from various sensors and other shipment data for all packages that it handles. As an additional example, a given shipper such as a retailer or a manufacturer may use a blockchain for all its outgoing shipments. As an additional example, blockchains may be vehicle specific such that event data for all the items being shipped on the same truck, train, ship, etc. may be recorded in the same blockchain. Each set of uploaded event data may be identified by a timestamp and a sensor ID to enable later correlation with the specific item that is monitored by the corresponding sensors. Recording the raw sensor data across multiple modules of the distributed ledgers of the blockchain provides many different parties with access to the raw sensor data because of the distributed nature of the blockchain record. It also prevents intentional or accidental modification or deletion of data due to the immutability of records recorded in a blockchain.

Responsive to determining that measurements for a particular environmental condition exceed the corresponding threshold level defined in the resistance data, the system may then generate a visualization that includes a first graphical element that represents the item and a second graphical element that represents the particular environmental condition to which the item is being harmfully subjected. As a specific example, suppose that the item is a set of vials containing a vaccine and that product data for the item includes a digital image (e.g., a JPEG file) of the set of vials containing the vaccine. Further suppose that resistance data for the item prescribes an upper temperature-threshold of 80° Fahrenheit. Under these circumstances, the system may generate the visualization by at least partially combining the digital image of the set of vials with an environmental condition graphic that specifically corresponds to an item being exposed to temperatures above a predetermined threshold level. For example, the system may generate the visualization by compositing the digital image of the set of vials with a graphical representation of a thermometer and/or fire symbol along with an indication of the degree of measured temperature and/or the time at which the measured temperature was sensed.

In some embodiments, a positioning of the first graphical element (e.g., the representation of the item) with respect to the second graphical element (e.g., the representation of the environmental condition) is designed to be indicative of the item being subjected to a heightened probability of damage from the incurred environmental condition. As a specific example, a fire symbol may be placed directly over the digital image of the set of vials to indicate a heightened probability of damage to the vaccine due to exposure to extreme temperatures.

After generating the graphical visualization that represents the item being subjected to the particular environmental condition, the system may cause the visualization to be transmitted to a computing device(s) that corresponds to one or more entities associated with the item (e.g., a shipper, a buyer, a seller, and/or any other interested parties). For example, the graphical visualization may be transmitted in near real-time to a smart phone of a shipping employee that has custody of the item when the harsh environmental condition is first detected. In this example, upon the visualization being presented to the shipping employee at the computing device, the shipping employee may immediately and intuitively recognize that remedial action is warranted to alleviate the harsh environmental condition for the item. In this way, the techniques described herein may be used to significantly increase the speed with which the shipping employee may take remedial action and, therefore, may significantly decrease the probability of the item being destroyed while en route to the destination. In various embodiments, the visualization may be presented to a seller and/or purchaser of the item and may even provide such parties with an option to select from one or more predetermined actions associated with the shipment. For example, a purchaser may be presented with a graphic visualization in near real-time indicating that the vial of vaccines is being (or has been) subjected to harsh temperatures and also provide the purchaser with the option to refuse delivery of the item.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3A illustrates exemplary product data that includes a product graphic of an item and resistance data that defines threshold levels for various environmental conditions in association with the item.

FIG. 3B illustrates exemplary product data that includes resistance data that defines multiple thresholds for a particular environmental condition where one or more thresholds correspond to a risk of the item becoming non-viable and one or more other thresholds correspond to the item actually becoming non-viable.

DETAILED DESCRIPTION

The following Detailed Description describes technologies for generating visualizations that graphically represent an item being exposed to extreme environmental conditions while en route to a destination. An exemplary visualization may include a still graphic that shows a symbol of a detected environmental condition positioned adjacent to and/or superimposed over a graphic that represents the item. Another exemplary visualization may include an animation that includes a sequence of frames that, when sequentially displayed at a particular frame rate, animate the item being subjected to the detected environmental condition. Various implementations include receiving measurements of the environmental conditions that the item is exposed to from sensors that are proximate to the item while it is en route to the destination. Then, in the event that thresholds are reached for specific environmental conditions (e.g., temperature, acceleration, etc.), visualizations may be generated that graphically represent the item being exposed to such specific environmental conditions.

For illustrative purposes, suppose that product data for the item includes a graphical representation of the item and an indication of a threshold temperature for the item. (e.g., a temperature above which the item will become damaged). Further suppose that while the item is en route to the destination, event data is received that indicates that the temperature of the item has risen above the predefined threshold temperature. Under these circumstances, a visualization may be generated that combines the graphical representation of the item with a graphical representation of heat exposure. In this way, a visualization that graphically represents both the item and the specific environmental conditions that the item is exposed to is generated dynamically in response to changing environmental conditions surrounding the item. This visualization may then be presented to interested parties in near real-time (e.g., within several seconds or minutes) to clearly and intuitively show the interested parties when and how the item is being subjected to harsh shipping conditions.

Figure 1A:
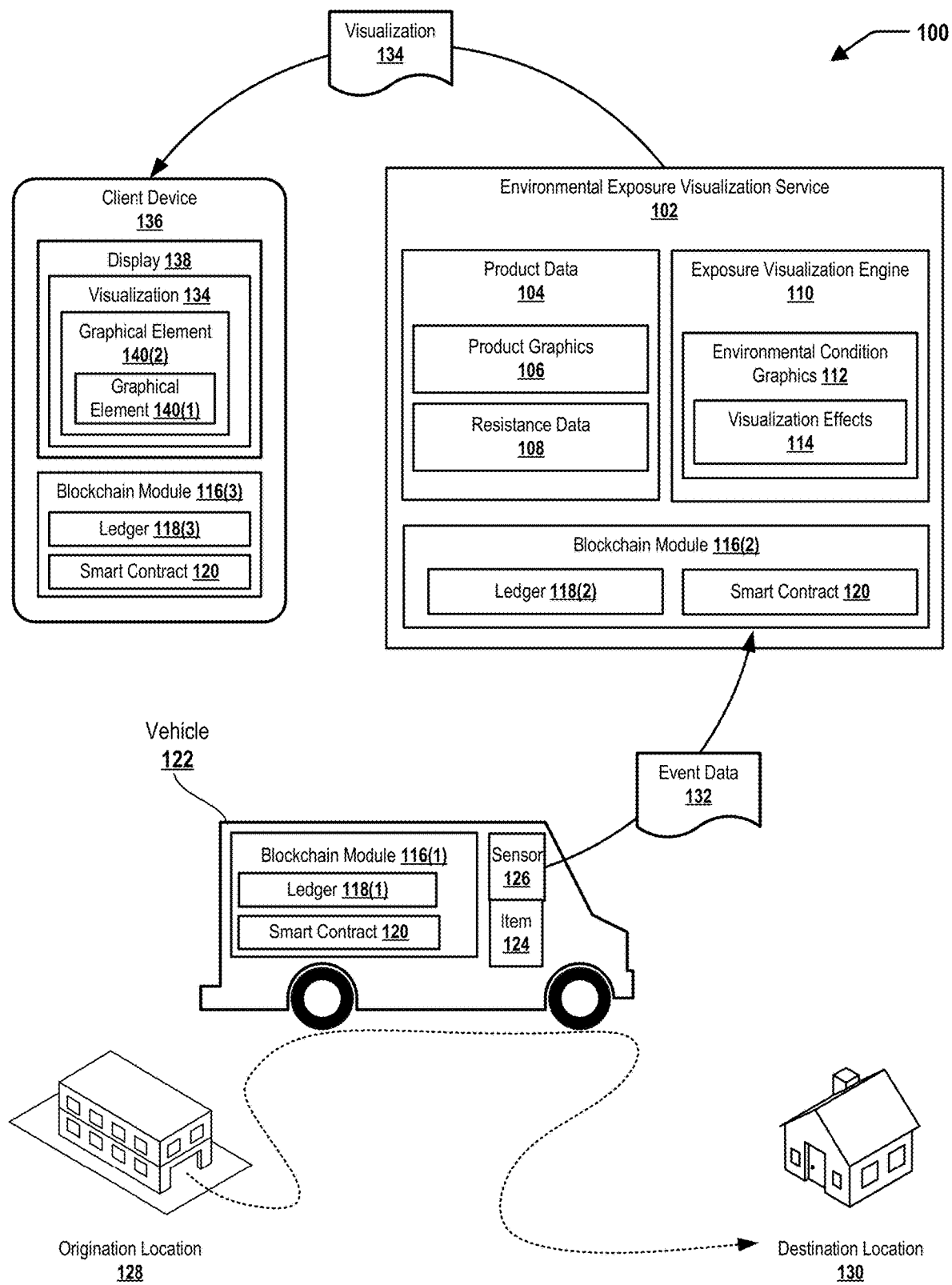
FIG. 1A illustrates an exemplary system for generating a visualization that graphically represents an item being exposed to potentially harmful environmental conditions while en route from an origination location to a destination location.

Turning now to FIG. 1A, illustrated is an exemplary system 100 for generating a visualization 134 that graphically represents an item 124 being exposed to potentially harmful environmental conditions while the item 124 is en route from an origination location 128 to a destination location 130. As illustrated, the system 100 includes a vehicle 122 that is equipped with sensors 126 for monitoring the environmental conditions surrounding the item 124, an environmental exposure visualization service 102 for generating and/or transmitting the visualization 134 that graphically represents the item 124 being exposed to predetermined (and potentially harmful) environmental conditions, and a client device 136 for presenting the visualization 134 to an interested party.

In the illustrated embodiment, the environmental exposure visualization service 102 stores (or otherwise has access to) product data 104 that corresponds to the item 124. The product data 104 may include one or more product graphics 106 associated with the item 124. An exemplary product graphic 106 may be a digital image (e.g., a JPEG) of the item 124 that is associated with a product listing from which the item 124 was purchased. For example, a seller may generate a listing for the item 124 on an online retailer website through which a purchaser may place an order for the item 124. The product graphic 106 may be a digital image of the item 124 that is uploaded by the seller as a part of generating the listing for the item 124. As a specific example, suppose that the item 124 is a set of vials containing a particular vaccine. In this example, an online listing for the item 124 may include a digital photograph (e.g., a JPEG) of the set of vials containing the particular vaccine.

As illustrated, the product data 104 may also include resistance data 108 associated with the item 124. The resistance data 108 may define one or more threshold levels for various environmental conditions to which the item 124 may potentially be exposed while en route to the destination location 130. Exemplary environmental conditions include, but are not limited to, pressure (e.g., the item being stacked under heavy items and/or subjected to unacceptable barometric pressure), acceleration (e.g., the item being shaken and/or dropped), humidity, temperature, light exposure (e.g., the item being exposed to ultra-violet light), chemical exposure (e.g., the item being exposed to oxygen and/or some other non-inert gas), and so on. Accordingly, exemplary threshold levels may include pressure-thresholds, acceleration-thresholds, humidity-thresholds, temperature-thresholds, light exposure-thresholds, chemical exposure-thresholds, and so on.

In some embodiments, the resistance data 108 may define different threshold levels in association with different degrees of specific environmental conditions. Continuing with the example in which the item 124 is the set of vials containing the particular vaccine, suppose that the particular vaccine may lose efficacy if subjected to temperatures below a first temperature or above a second temperature. Thus, the particular vaccine must be maintained at a temperature that is within some acceptable temperature range. Under these circumstances, the resistance data 108 for the item 124 may define a lower temperature-threshold as the first temperature and may further define an upper temperature-threshold as the second temperature.

As illustrated, the environmental exposure visualization service 102 includes an exposure visualization engine 110 for generating and/or transmitting visualizations that graphically represent the item 124 being subjected to potentially harmful environmental conditions. As described in more detail below, the visualizations 134 may be generated by combining a first graphical element 140(1) that represents the item 124 with a second graphical element 140(2) that represents a detected environmental condition. In some embodiments, the environmental exposure visualization service 102 may obtain the first graphical element 140(1) from a product listing that the item 124 was purchased from. For example, a digital image of the item 124 may be downloaded from the product listing and provided to the environmental exposure visualization service 102 to facilitate implementation of the disclosed techniques. In some embodiments, the environmental exposure visualization service 102 may obtain the second graphical element 140(2) from environmental condition graphics 112 that correspond to various predetermined environmental conditions. For example, as described in more detail with respect to FIG. 2A, the environmental condition graphics 112 may include one or more "pressure" graphical elements that graphically represent various degrees of pressure being exerted on an item, one or more "acceleration" graphical elements that graphically represent an item being subjected to various degrees of acceleration, one or more "humidity" graphical elements that graphically represent an item being exposed to humid conditions, and/or one or more "temperature" graphical elements that graphically represent an item being exposed to upper and/or lower temperature thresholds, any or all of which may be potentially harmful to the item.

In the illustrated embodiment, the environmental condition graphics 112 may include one or more visualization effects 114 for generating an animation of the item 124 being subjected to a predefined environmental condition. As a specific example, a visualization effect 114 may be usable to generate a sequence of frames that, when sequentially displayed at a frame rate, animate the item 124 being violently shaken during transport. As another specific example, a visualization effect 114 may be usable to generate a sequence of frames that animate the item 124 being vertically dropped and then impacting a surface (e.g., a floor of a cargo area). In this way, visualizations 134 that are generated and presented to interested parties may dynamically animate the item 134 being neglected or even abused while en route to the destination location.

As further illustrated, the environmental exposure visualization service 102 includes a blockchain module 116 for maintaining records of event data 132 that is received from the sensors 126 that monitor the environmental conditions surrounding the item 124. For example, instances of the event data 132 that correspond to measurements that exceed the threshold levels defined in the resistance data 108 may be recorded in a plurality of distributed ledgers 118 of a blockchain. In the illustrated example, the system 100 includes three individual blockchain modules 116(1)-116(3) that are distributed across various system components. More specifically, a first blockchain module 116(1) is configured for implementation at the vehicle 122 that transports the item and uses the sensors 126 to monitor the environmental conditions, a second blockchain module 116(2) is configured for implementation on the environmental exposure visualization service 102 that generates and/or transmits the visualization 134, and a third blockchain module 116(3) is configured for implementation on the client device 136 that presents the visualization 134 to an interested party.

In some embodiments, each of the individual blockchain modules 116 may maintain a corresponding ledger 118. For example, as illustrated, the first blockchain module 116(1) maintains a first ledger 118(1), the second blockchain module 116(2) maintains a second ledger 118(2), and the third blockchain module 116(3) maintains a third ledger 118(3). In this way, the multiple instances of the ledger 118 are decentralized and distributed to provide various interested parties with individual records of the event data 132. In this way, the record of the event data 132 is highly resistant to tampering (e.g., malicious modifications) and will persist even if any individual one of the ledgers 118 becomes corrupted or otherwise unusable (e.g., via a catastrophic failure of a storage medium). It will be appreciated that recording the "raw" event data 132 in a distributed fashion across the multiple ledgers 118 provides multiple different parties with access to the "raw" event data 132 while also preventing intentional or accidental modification or deletion of the event data 132.

In some embodiments, a unique set of ledgers 118 may be created for the item 124. Alternatively, there may be one or more existing sets of ledgers 118 that are used to store event data 132 that is received in association with multiple different items. For example, one shipping provider may have its own sets of defined ledgers 118 for recording event data 132 received from various sensors 126 and other shipment data for all packages that it handles. As an additional example, a given shipper such as a retailer or a manufacturer may use its own sets of ledgers 118 for all its outgoing shipments. As an additional example, individual sets of ledgers 118 may be vehicle specific such that event data 132 for all the items 124 being shipped on the same truck, train, ship, etc. may be recorded in the same set of ledgers 118. In some embodiments, each instance of event data 132 that is uploaded and/or stored in the ledgers 118 may be identified by a timestamp and a sensor ID to enable later correlation with the specific item 124 that is being monitored by the corresponding sensors 126.

With respect to the specific data flow scenario illustrated in FIG. 1A, event data 132 is received by the environmental exposure visualization service 102 while the item 124 is being transported in the vehicle 122 from the origination location 128 to the destination location 130. The event data 132 indicates measurements for various environmental condition(s) to which the item 124 is exposed and for which threshold level(s) are defined within the resistance data 108. For example, in an implementation where the resistance data 108 defines an upper temperature-threshold and a lower temperature-threshold, the event data 132 may include temperature data that is generated via a temperature sensor. Additionally, or alternatively, the resistance data 108 may define an acceleration-threshold and the event data 132 may include acceleration data that is generated via an accelerometer. One or more sensors 126 from which the environmental exposure visualization service 102 receives the event data 132 may be packed with/attached to the item 124 inside of a box, an envelope, and/or any other type of packaging unit. For example, a seller of the item 124 may pack the sensors 126 and the item 124 both within a cardboard box prior to shipping the item. Additionally, or alternatively, one or more sensors 126 may be affixed within a cargo area (e.g., a van box) of a vehicle that is transporting the item 124.

Based on the event data 132, the environmental exposure visualization service 102 may determine when measurements for a particular environmental condition reach or exceed a threshold level for that particular environmental condition, e.g., as defined in the resistance data 108. For example, the environmental exposure visualization service 102 may determine that a particular temperature measurement exceeds an upper temperature-threshold that the resistance data 108 defines for the item 124.

Responsive to this determination, the environmental exposure visualization service 102 may then generate a visualization 134 that includes a first graphical element 140(1) that represents the item 124 and a second graphical element 140(2) that represents the particular environmental condition to which the item 124 is being harmfully subjected. To illustrate this point, suppose that the item 124 is the set vials containing the vaccine and that product graphics 106 for the item include the digital image of the set of vials that is taken from the online listing. Further suppose that resistance data 108 for the item 124 prescribes an upper temperature-threshold of 80° Fahrenheit. Under these circumstances, the first graphical element 140(1) that represents the item 124 may be the digital image of the set of vials that is taken from the online listing. Furthermore, the second graphical element 140(2) that represents the particular environmental condition may be an illustration of a "hot" thermometer (e.g., a thermometer illustrated with mercury that has risen) and a flame symbol. In this specific but nonlimiting example, the environmental exposure visualization service 102 may generate the visualization 134 by compositing the digital image of the set of vials with the illustration of the "hot" thermometer and the flame symbol. As used herein, the term "compositing" refers to the imaging process of electronically combining two or more digital images and/or animations to form a single digital image and/or single animation.

As described in more detail below with relation to FIGS. 2 and 3, a positional relationship between the first graphical element 140(1) and the second graphical element 140(2) may be designed to indicate that the item 124 is being subjected to a heightened probability of damage from the environmental condition. For example, the second graphical element 140(2) may include a fire symbol that is placed directly over the first graphical element 140(1) that represents the item 124, to represent or otherwise give the impression that the item 124 is being exposed to high temperatures.

After generating the visualization 134, the environmental exposure visualization service 102 causes the visualization 134 to be rendered on a display 138 of the client device 136 that corresponds to one or more entities associated with the item 124 (e.g., interested parties). For example, the visualization 134 may be transmitted in near real-time to a smart phone of a shipping employee that has custody of the item 124 when the harsh environmental condition is initially detected. In this example, upon the visualization 134 being presented to the shipping employee at the client device 136, the shipping employee may immediately and intuitively recognize that remedial action is warranted to alleviate the harsh environmental condition for the item 124. In this way, the techniques described herein may be used to significantly increase the speed with which the shipping employee may take remedial action and, therefore, may significantly decrease the probability of the item 124 being irreversibly damaged.

In some embodiments, one or more of the blockchain modules 116 may be configured to implement a smart contract 120 that is associated with the item 124. Specifically, the smart contract 120 may include computer code that causes one or more of the blockchain modules 116 to implement various actions based on specific triggering criteria. As an example, the smart contract 120 may cause a report to be sent to a specified email or other electronic communication address when thresholds, as defined in the resistance data 108, are exceeded. As another example, the smart contract 120 may cause the destination location 130 to be dynamically updated when thresholds, as defined in the resistance data 108, are exceeded. For example, the item 124 may be rerouted back to the sender if the event data 132 indicates potential damage during transport based on a measured condition taken at a sensor 126 exceeding a predefined threshold level defined in the resistance data 108. This dynamic change to delivery routing may be performed automatically in the sense that the triggering condition and the new destination location are encoded in the smart contract 120 prior to the start of shipment and the change is implemented during transport without direct human intervention.

In various embodiments, the smart contract 120 may be used to implement other responses to predetermined environmental conditions. For example, a replacement item may be shipped out following a determination that the event data 132 indicates a heightened probability of damage to the "original" item 124. As another example, for predetermined types of items, a price to be paid for the item may be modified (e.g., reduced) automatically upon the event data 132 indicating that the thresholds were reached for certain environmental conditions. Such embodiments may be applicable to certain types of food products that are not spoiled by being stored at temperatures that are higher or lower than optimal, but the variation in temperature may reduce the quality, flavor, and thus the ultimate market price of the item. Thus, various price modification parameters may be encoded in the smart contract 120 by associating values for environmental conditions with one or more different pricing levels. The smart contract 120 may also be used to implement a full refund of the purchase price, if paid in advance, for the item 124 based on the event data 132 showing environmental conditions outside of predetermined levels.

Figure 1B:
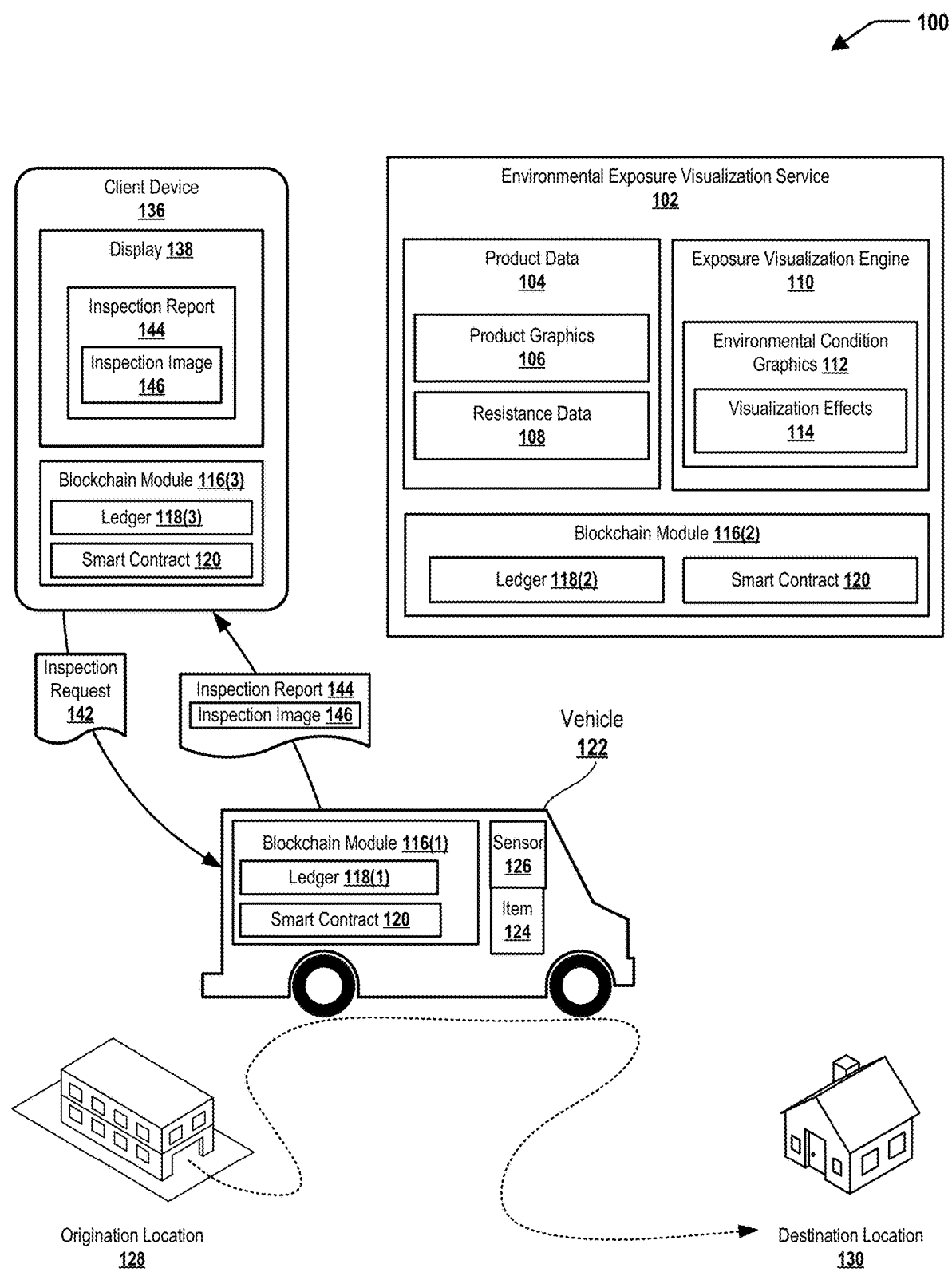
FIG. 1B illustrates an exemplary scenario where the system facilitates generating an inspection request in response to receiving the visualization that graphically represents the item being exposed to potentially harmful environmental conditions.

Turning now to FIG. 1B, illustrated is an exemplary scenario where the system 100 facilitates generating an inspection request 142 in response to receiving the visualization 134 that graphically represents the item 124 being exposed to potentially harmful environmental conditions. An exemplary inspection request 142 may include an indication of the specific environmental conditions to which the item 124 has been exposed and which triggered generation of the visualization 134. As illustrated, the inspection request 142 may be transmitted directly to a courier (e.g., a shipping company) that currently has custody of and is transporting the item 124. For example, the inspection request 142 may be transmitted from the client device 136 to an onboard computing system that is installed into the vehicle 122 that is transporting the item 124. Additionally, or alternatively, the inspection request 142 may be transmitted from the client device 136 to a mobile computing device (e.g., a smart phone, tablet computer, etc.) that is carried by a shipping employee that currently has custody over the item 124.

In some embodiments, the inspection request 142 is specifically designed to prompt the courier that currently has custody of the item 124 to perform an inspection of item 124 due to the exposure to the potentially harmful conditions. For example, the inspection request 142 may include an indication of a tracking number of a package that contains the item 124 and an authorization to open the package to inspect (e.g., visually or otherwise) the item 124. Based on the results of the inspection, an inspection report 144 may be generated and transmitted back to the interested party which requested the inspection to begin with. The inspection report 144 may include a text description of any identified damage to the item 124. For example, in generating the inspection report 144, the courier may transcribe a description of any visible damage (e.g., scratches, dents, and/or any other visible damage) that is observed on the item 124. Furthermore, as illustrated, an exemplary inspection report 144 may include an inspection image 146 that is taken during the inspection of the item 124. For example, the courier that performs the inspection may use a smart phone equipped with a camera to take a digital image of the item after having opened the package that contains the item 124.

Ultimately, the inspection report 144 may be transmitted back to the client device 136 and displayed on the display 138. In this way, after having received the visualization that graphically represents the item 124 being exposed to potentially harmful environmental conditions and responding by generating and transmitting the inspection request 142, the interested party at the client device 136 may receive a timely response from the shipper that the item 124 is in acceptable condition or, alternatively, confirmation that the item 124 has been damaged.

Figure 1C:
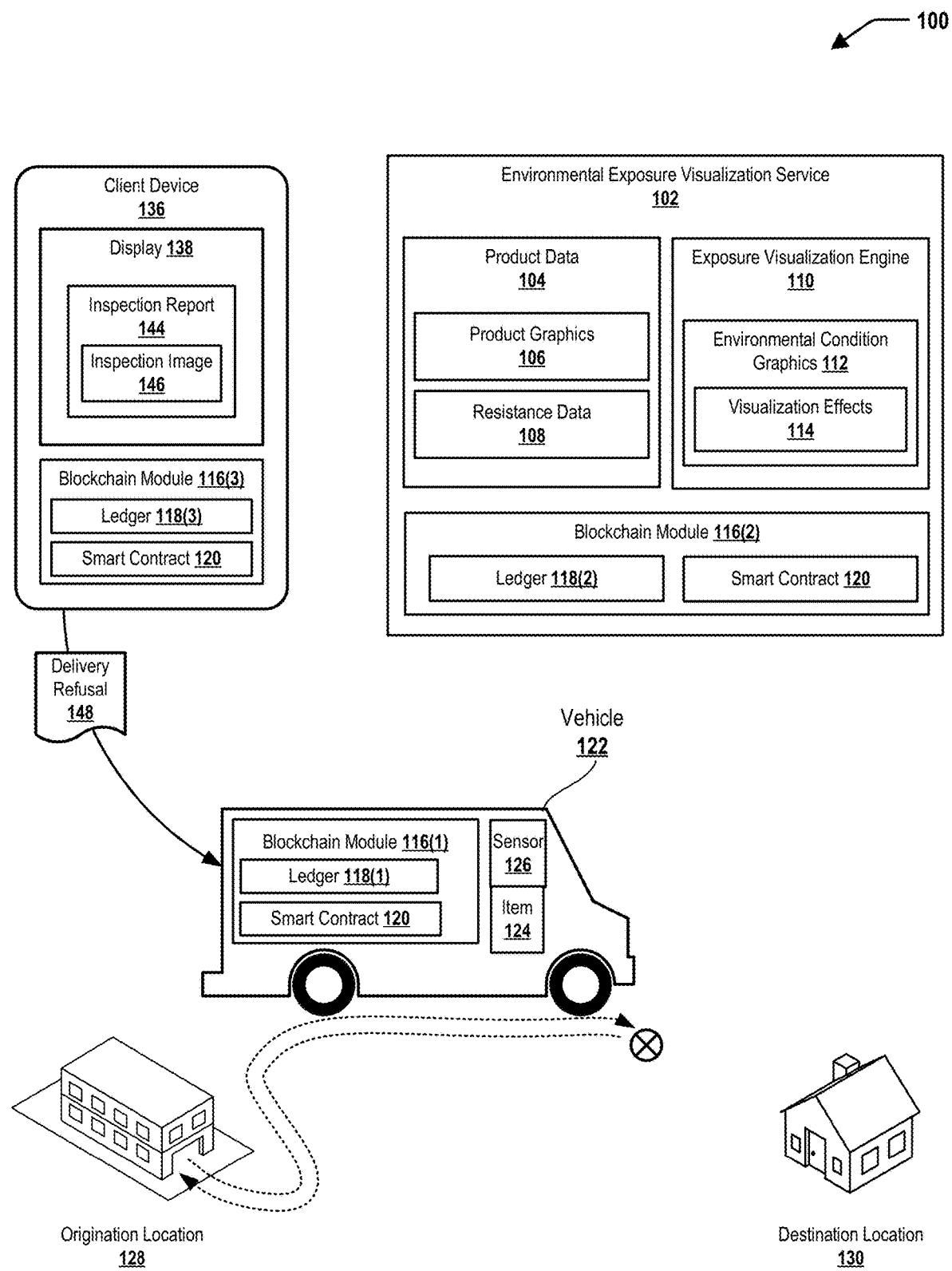
FIG. 1C illustrates an exemplary scenario where the system facilitates generating a delivery refusal.

Turning now to FIG. 1C, illustrated is an exemplary scenario where the system 100 facilitates generating a delivery refusal 148. In some embodiments, the delivery refusal 148 may be generated subsequent to receiving the inspection report 144. For example, an interested party may receive the visualization 134 graphically representing the item 124 being exposed to potential harmful environmental conditions. In response to the visualization 134, the interested party may generate the inspection request 142 and ultimately may receive the inspection report 144. Based on the results of the inspection report 144, the interested party may decide to refuse delivery of the item 124 and, therefore, may generate the delivery refusal 148 and have the same transmitted to the vehicle 122. As illustrated, in response to receiving the delivery refusal 148, the item 124 may be rerouted back to the origination location 128 rather than being allowed to continue to the destination location 130 to complete delivery of the item 124.

Figure 1D:
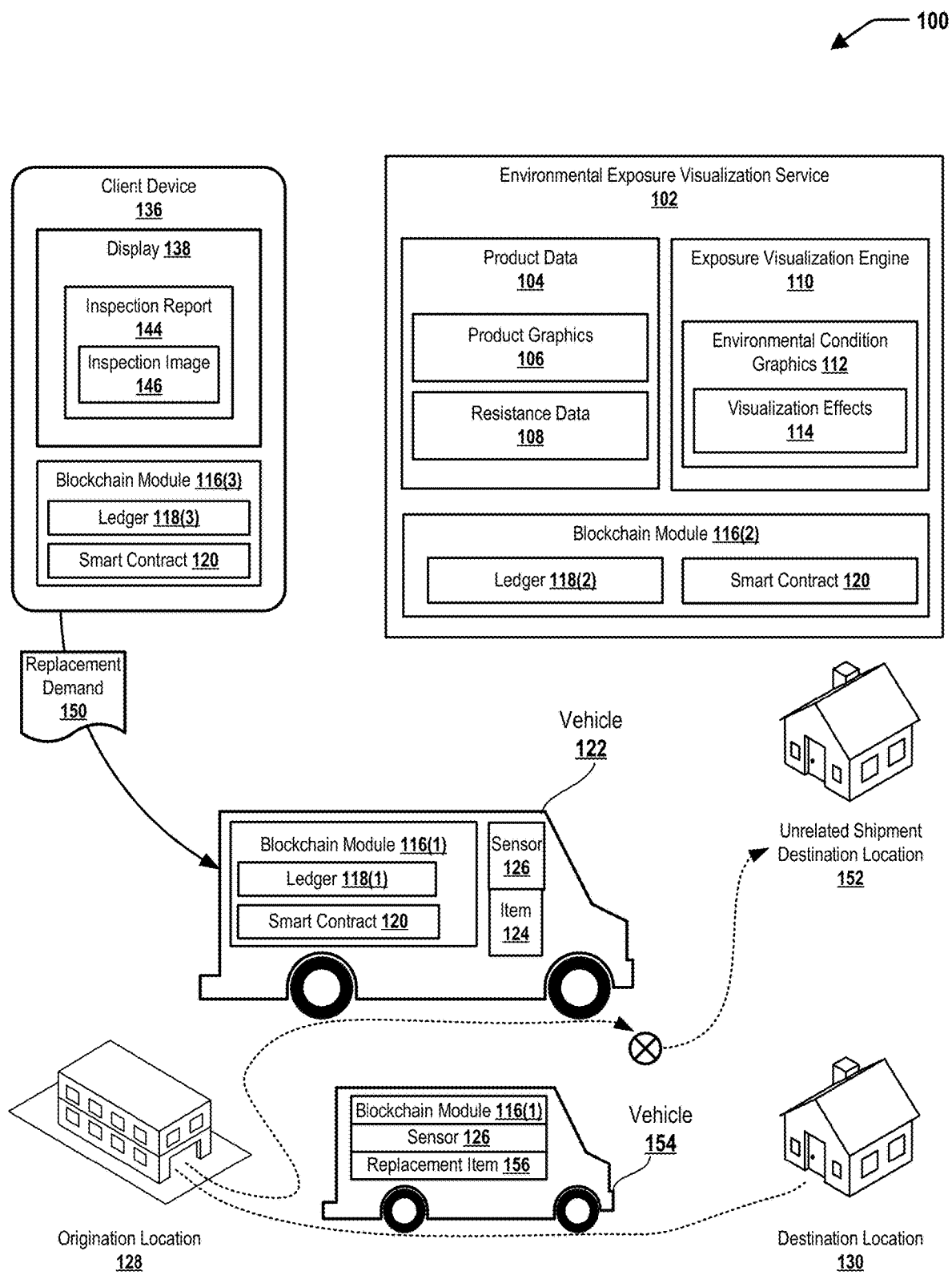
FIG. 1D illustrates an exemplary scenario where the system facilitates generating a replacement demand to cause a replacement item to be delivered to the destination location in lieu of the "original" item.

Turning now to FIG. 1D, illustrated is an exemplary scenario where the system 100 facilitates generating a replacement demand 150 to cause a replacement item 156 to be delivered to the destination location 130 in lieu of the "original" item 124. In an exemplary scenario, the replacement demand 150 may be generated subsequent to having received and viewed the inspection report 144 and/or inspection image 146 at the client device 136. For example, after having received the visualization 134 and transmitted the inspection request 142, an interested party may receive an inspection image 146 that confirms that the "original" item 124 has been completely and irreversibly damaged. For example, the inspection image 146 may show one or more vials of the vaccine having been completely crushed rendering the product useless. Thus, in response to viewing the inspection image 146, the interested party sends the replacement demand 150 to the seller of the item 124 to prevent the "original" item from being delivered to the destination location and to further cause a replacement item 156 to be sent out to the destination location 130. For example, as illustrated, the vehicle 122 is rerouted so that rather than continuing to the destination location 130 for item 124, it instead continues on to some unrelated shipment destination location(s) 152 (e.g., to complete some other deliveries). As further illustrated, another vehicle 154 may be subsequently sent out from the origination location 128 with a replacement item 156 that will then be transported to the destination location 130.

Figure 1E:
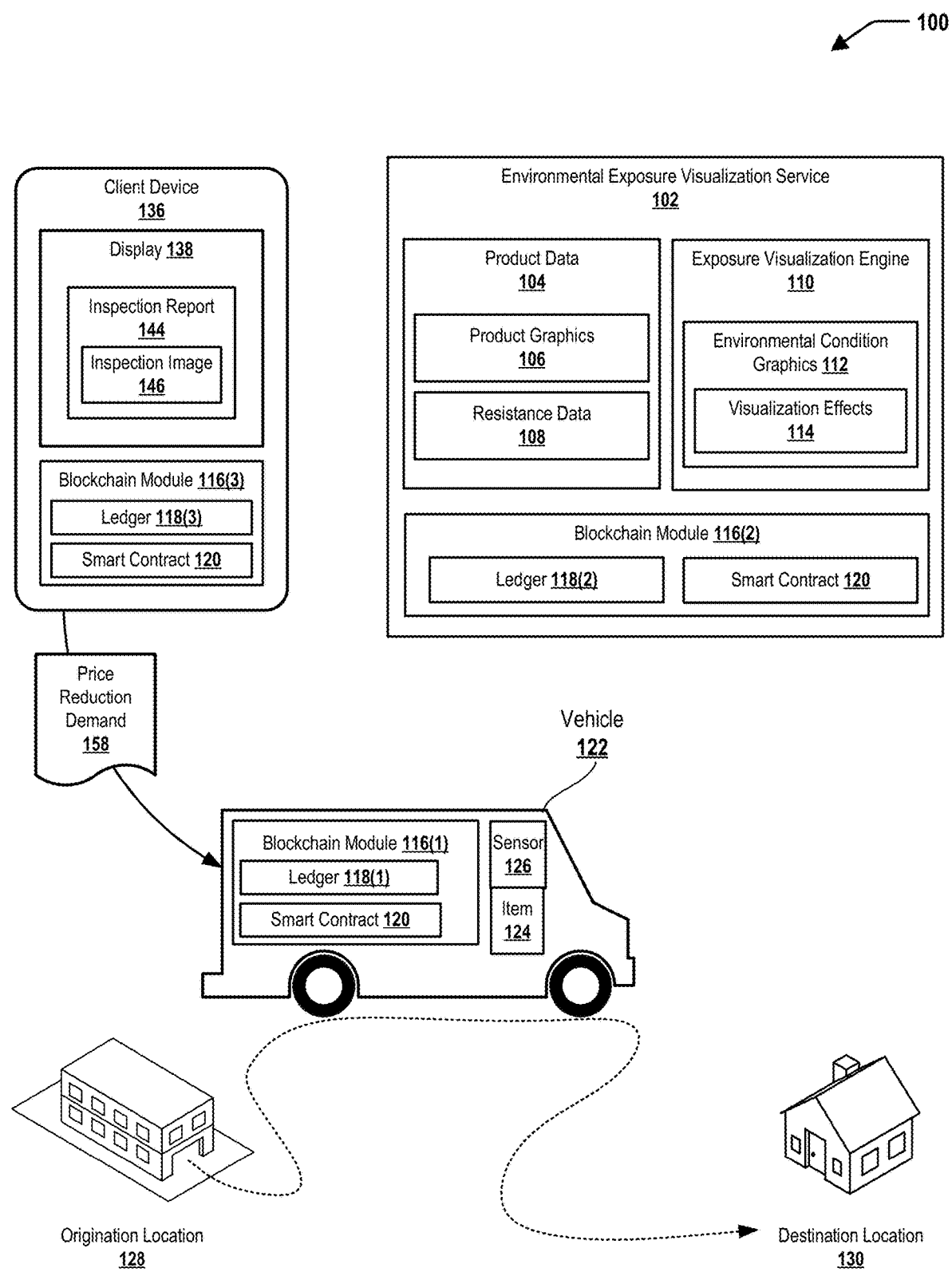
FIG. 1E illustrates an exemplary scenario where the system facilitates generating a price reduction demand to accept delivery of the item on the condition that the price for the item be reduced by some specified amount.

Turning now to FIG. 1E, illustrated is an exemplary scenario where the system 100 facilitates generating a price reduction demand 158 to accept delivery of the item 124 on the condition that a price for the item be reduced by some specified amount. In an exemplary scenario, the price reduction demand 158 may be generated subsequent to having received and viewed the inspection report 144 and/or inspection image 146 at the client device 136. For example, after having received the visualization 134 and transmitted the inspection request 142, an interested party may receive an inspection image 146 that confirms that a condition or quality of the item 124 has been negatively impacted due to being subjected to harmful environmental conditions. Nonetheless, although the value of the item 124 to the interested party (e.g., buyer) may be lessened, the buyer may still wish to accept the item 124 for some lowered price point. For example, the inspection image 146 may show one or more vials of the vaccine having been completely crushed rendering the product useless, but one or more other vials of the vaccine being left undamaged and in substantially its original form. Thus, in response to viewing the inspection image 146, the interested party sends the price reduction demand 158 to the seller of the item 124 to refuse delivery of the item 124 at the originally contracted for price but to accept delivery of the item 124 at some reduced price. Then, as illustrated, the vehicle 122 is continues to complete the delivery of the "slightly damaged" item 124 and the buyer is refunded some portion of the original sale price.

Figure 2A:
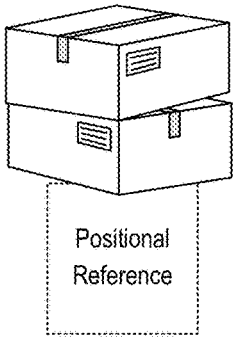
FIG. 2A illustrates exemplary environmental condition graphics that are designed to graphically represent an item being exposed to various degrees of specific environmental conditions.
Figure 2A:
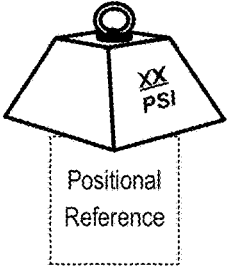
Figure 2A:
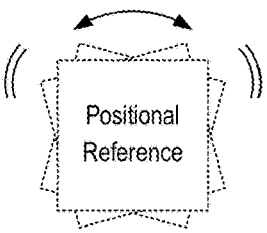
Figure 2A:
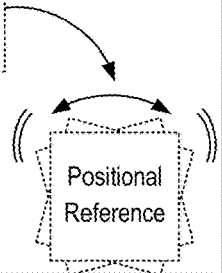
Figure 2A:
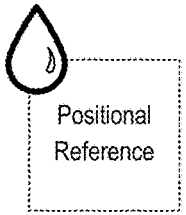
Figure 2A:
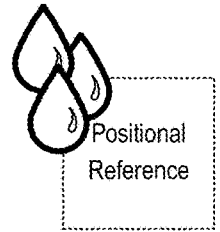
Figure 2A:
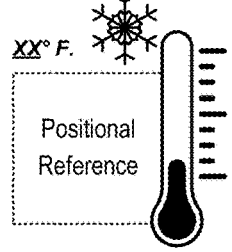
Figure 2A:
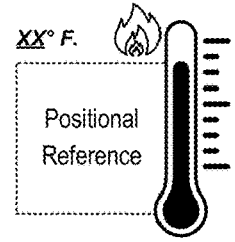

Turning now to FIG. 2A, illustrated are exemplary environmental condition graphics 112 that are designed to graphically represent an item (not shown in FIG. 2A) being exposed to various degrees of specific environmental conditions that may be potentially harmful to an item. As illustrated, the environmental condition graphics 112 are designed to represent an item being exposed to two different degrees of four different environmental conditions (i.e., a first degree and a second degree of each of pressure, acceleration, humidity, and temperature). Accordingly, a total of eight individual environmental condition graphics 112 are shown. As further illustrated, each individual one of the environmental condition graphics 112 includes a positional reference for placement of a graphical representation of the item 124. For example, upon the event data 132 indicating that an item 124 has been exposed to a threshold level of a particular environmental condition, a visualization 134 may be generated by compositing a digital image of the item 124 into the appropriate environmental condition graphic 112 at the position indicated by the positional reference. For example, the digital image of the item 124 may be cropped appropriately and then inserted into the positional reference.

Referring specifically to the "Pressure" environmental condition, a first environmental condition graphic 112(1) is shown that is usable to graphically represent an item 124 being subjected to a first degree of pressure whereas a second environmental condition graphic 112(2) is shown that is usable to graphically represent an item 124 being subjected to a second degree of pressure. More specifically, by compositing a graphical element that represents the item 124 (e.g., a digital image from an online listing) into the first environmental condition graphic 112(1) at the location of the positional reference, a visualization 134 can be generated that shows the item 124 stacked underneath a pair of packages. In some embodiments, the environmental exposure visualization service 102 generates and transmits such a visualization 134 in response to the event data 132 indicating that a first pressure-threshold has been reached at a pressure transducer sensor (not shown in FIG. 2A) associated with the item 124. Similarly, by compositing a graphical element that represents the item 124 into the second environmental condition graphic 112(2) at the location of the positional reference, a different visualization 134 can be generated that shows the item 124 stacked underneath a metallic weight. In some embodiments, the environmental exposure visualization service 102 generates such a "different" visualization 134 responsive to the event data 132 indicating that a second pressure-threshold has been reached at a pressure transducer sensor associated with the item 124.

Referring specifically to the "Acceleration" environmental condition, a third environmental condition graphic 112(3) is designed to animate an item 124 being subjected to a first degree of acceleration, whereas a fourth environmental condition graphic 112(4) is designed to animate an item 124 being subjected to a second degree of acceleration. More specifically, by compositing a graphical element that represents the item 124 into the third environmental condition graphic 112(3) at the location of the positional reference, a visualization 134 can be generated that animates the item 124 being "jostled" or "shaken" about as it might be if left unsecured in the vehicle 122 during transport. In some embodiments, the environmental exposure visualization service 102 generates such a visualization 134 in response to the event data 132 indicating that a first acceleration-threshold has been reached at an accelerometer sensor associated with the item 124. In some embodiments, the thresholds may be based on combinations of both sensor reading levels and date/time. For example, the environmental exposure visualization service 102 may generate a visualization 134 using the third environmental condition graphic 112(3) if and when the event data 132 indicates continual acceleration readings above a predetermined threshold for a predetermined time period. Similarly, by compositing a graphical element that represents the item 124 into the fourth environmental condition graphic 112(4) at the location of the positional reference, a different visualization 134 can be generated that animates the item 134 being dropped. In some embodiments, the environmental exposure visualization service 102 generates such a visualization 134 in response to the event data 132 indicating that a second acceleration-threshold has been reached.

Referring specifically to the "Humidity" environmental condition, a fifth environmental condition graphic 112(5) is shown that is usable to graphically represent an item 124 being subjected to a first degree of humidity whereas a sixth environmental condition graphic 112(6) is shown that is usable to graphically represent an item 124 being subjected to a second degree of humidity. As described above, the environmental exposure visualization service 102 may generate and transmit visualizations using the fifth environmental condition graphic 112(5) or the sixth environmental condition graphic 112(6) at the location of the positional reference in response to the event data 132 indicating that a first humidity-threshold or a second humidity-threshold has been reached, respectively.

Referring specifically to the "Temperature" environmental condition, a seventh environmental condition graphic 112(7) is shown that is usable to graphically represent an item 124 being subjected to a lower temperature-threshold and an eighth environmental condition graphic 112(8) is shown that is usable to graphically represent an item 124 being subjected to an upper temperature-threshold. Thus, the seventh and eighth environmental condition graphics are usable to graphically represent the item 124 being exposed to temperatures outside of some predetermined range of acceptable temperatures.

It should be appreciated that individual ones of the environmental condition graphics 112(1) through 112(8) are usable to serve as an exemplary second graphical element 140(2) that represents the particular environmental condition to which the item 124 is being subjected during transport. For example, the environmental exposure visualization service 102 may dynamically generate a visualization 134 that graphically represents and/or animates the item 124 being exposed to various degrees of particular environmental conditions by compositing a first graphical element 140(1) that represents the item 124 into an appropriate one of the environmental condition graphics 112(1) through 112(8) at the illustrated positional reference.

Figure 2B:
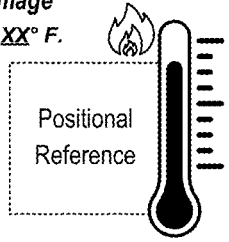
FIG. 2B illustrates exemplary groupings of environmental condition graphics that are designed to graphically represent an item being at risk of becoming non-viable at a first threshold for a particular environmental condition and to further graphically represent the item actually becoming non-viable at a second threshold for the particular environmental condition.
Figure 2B:
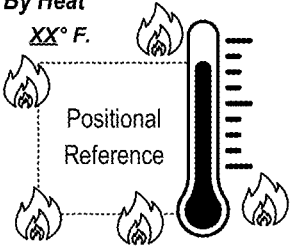
Figure 2B:
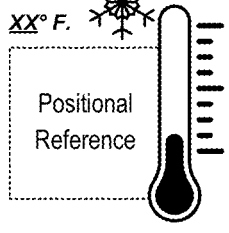
Figure 2B:
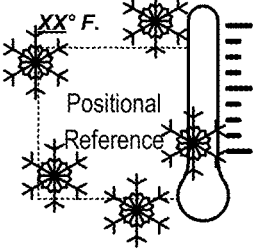

Turning now to FIG. 2B, illustrated are exemplary groupings of environmental condition graphics that are designed to graphically represent an item being at risk of becoming non-viable at a first threshold for a particular environmental condition and to further graphically illustrate the item actually becoming non-viable at a second threshold for the particular environmental condition. As illustrated, the environmental condition graphics 112 are designed to first represent an item being exposed to a potentially damaging degree of an environmental condition to provide a "warning" at a time when remedial action may still potentially save the product from becoming non-viable. Then, if the item is exposed to a greater degree of the environmental condition, environmental condition graphics are designed to then represent the item non-viable due to the extreme nature of the environmental condition.

Referring specifically to the "Temperature Too Hot" environmental condition, a ninth environmental condition graphic 112(9) is shown that is usable to graphically represent an item 124 being subjected to a first degree of heat that is putting the item 124 at a heightened risk of becoming damaged and/or non-viable. For example, under circumstances where it is known that the item 124 will become non-viable (e.g., irreversibly damaged, destroyed, etc.) if the item reaches or exceeds 100° F., then the techniques herein may be configured to expose the ninth environmental condition graphic 112(9) if it is detected that the item 124 has reached 80° F. In this way, exposure of the ninth environmental condition graphic 112(9) serves as a warning to one or more interested parties so as to spring them into taking remedial action for the item 124 becomes non-viable.

Continuing to refer specifically to the "Temperature Too Hot" environmental condition, a tenth environmental condition graphic 112(10) is shown that is usable to graphically represent an item 124 being subjected to a second degree of heat that actually results in the item 124 becoming damaged and/or non-viable. For example, continuing with the circumstances where it is known that the item 124 will become non-viable (e.g., irreversibly damaged, destroyed, etc.) if the item reaches 100° F., then the techniques herein may be configured to expose the tenth environmental condition graphic 112(10) if it is detected that the item 124 has reached 100° F. In this way, exposure of the tenth environmental condition graphic 112(10) serves the purpose of informing one or more interested parties that the item 124 has now become non-viable and that remedial action is no longer available.

Referring specifically to the "Temperature Too Cold" environmental condition, an eleventh environmental condition graphic 112(11) is shown that is usable to graphically represent an item 124 being subjected to a degree of cold that is putting the item 124 at a heightened risk of becoming damaged and/or non-viable. For example, under circumstances where it is known that the item 124 will become non-viable (e.g., irreversibly damaged, destroyed, etc.) if the item temperature falls below 32° F., then the techniques herein may be configured to expose the eleventh environmental condition graphic 112(11) if it is detected that the item has reached 40° F. Similar to as described above, exposure of the eleventh environmental condition graphic 112(11) serves as a warning to one or more interested parties so as to spring them into taking remedial action for the item 124 becomes non-viable.

Continuing to refer specifically to the "Temperature Too Cold" environmental condition, a twelfth environmental condition graphic 112(12) is shown that is usable to graphically represent an item 124 being subjected to a second degree of cold that actually results in the item 124 becoming damaged and/or non-viable. For example, continuing with the circumstances where it is known that the item 124 will become non-viable (e.g., irreversibly damaged, destroyed, etc.) if the item temperature falls below 32° F., then the techniques herein may be configured to expose the twelfth environmental condition graphic 112(12) if it is detected that the item 124 has reached 32° F. In this way, exposure of the twelfth environmental condition graphic 112(12) serves the purpose of informing one or more interested parties that the item 124 has now become non-viable and that remedial action is no longer available.

Turning now to FIG. 3A, exemplary product data 104 is shown that includes a product graphic 106 of the item 124 and resistance data 108 that defines threshold levels for various environmental conditions. As described above, the product graphic 106 may correspond to a product listing that the item 124 was purchased from. As a specific example, a digital image of the item 124 may be obtained by the environmental exposure visualization service 102 from an online retailer from which the item 124 was purchased. Then, the digital image may be used as the first graphical element 140(1) that represents the item 124 within the generated visualizations 134.

In some embodiments, the resistance data 108 defines one or more threshold levels for one or more environmental conditions such as, for example, pressure, acceleration, humidity, and temperature. As illustrated, the resistance data 108 defines threshold levels for two different degrees of four different environmental conditions (i.e., a first degree and a second degree of a pressure, acceleration, humidity, and temperature). In some embodiments, individual threshold levels defined in the resistance data 108 being satisfied may trigger generation of a visualization 134 using a corresponding environmental condition graphics 112 as described in relation to FIG. 2A. For example, in response to the "Pressure Threshold 1" of 5 PSI being reached in one or more instances of the event data 132, the environmental exposure visualization service 102 may generate a visualization 134 by compositing the product graphic 106 into the positional reference of the first environmental condition graphic 112(1) that is usable to graphically represents the item 124 being subjected to the first degree of pressure. Similarly, in response to the "Pressure Threshold 2" of 15 PSI being reached in one or more instances of the event data 132, the environmental exposure visualization service 102 may generate another visualization 134 by compositing the product graphic 106 with the second environmental condition graphic 112(2) that is usable to graphically represent the item 124 being subjected to the second degree of pressure.

In some embodiments, one or more fields of the resistance data 108 may be set as being "not applicable" for a specific item and/or specific class of items. For example, in the illustrated example in which the item 124 is the set of vials containing the vaccine, it can be appreciated that since the actual product (e.g., the vaccine) is sealed within the individual vials the environmental condition of humidity may have no damaging effect on the product. Thus, in the illustrated example, the humidity-thresholds are set as being "not applicable" (e.g., "N/A") so that fluctuating and even extreme humidity conditions will not trigger the generation and/or transmission of any visualizations 134.

In some embodiments, two fields of the resistance data 108 may define an acceptable range for a particular environmental condition. For example, as illustrated, the resistance data 108 defines a "Temperature Threshold 1" that sets a lower temperature-threshold of an acceptable range of temperatures and further defines a "Temperature Threshold 2" that sets an upper temperature-threshold of the acceptable range of temperatures. Here, the acceptable range of temperatures for the item 134 is defined as being greater than or equal to 40° Fahrenheit and less than or equal to 80° Fahrenheit. Thus, in response to the event data 132 indicating that the temperature surrounding the item 134 falls below the "Temperature Threshold 1" of 40° Fahrenheit, the environmental exposure visualization service 102 may generate a visualization 134 by compositing the product graphic 106 into the seventh environmental condition graphic 112(7) (as shown in FIG. 2A) that is usable to graphically represent an item 124 being subjected to the lower temperature-threshold. In contrast, in response to the event data 132 indicating that the temperature surrounding the item 124 rises above the "Temperature Threshold 2" of 80° Fahrenheit, the environmental exposure visualization service 102 may generate a different visualization 134 by compositing the product graphic 106 into the eighth environmental condition graphic 112(8) that is usable to graphically represent an item 124 being subjected to the upper temperature-threshold.

Turning now to FIG. 3B, illustrated is exemplary product data 104 that includes resistance data 108 that defines multiple thresholds for a particular environmental condition where one or more thresholds correspond to a risk of the item becoming non-viable in one or more other thresholds correspond to the item actually becoming non-viable.

As illustrated, the resistance data defines two different thresholds for exposure to cold temperatures. Specifically, the resistance data 108 defines a "Cold Threshold 1" of 40° F. that corresponds to the item being exposed to a degree of cold that puts the item at risk of becoming non-viable. The resistance data 108 further defines a "Cold Threshold 2" of 32° F. that corresponds to the item being exposed to a more extreme degree of cold that will actually result in the item becoming non-viable. It should be appreciated therefore while implementing the techniques described herein, sensor data indicating that the item has reached the "Cold Threshold 1" of 40° F. may result in the $11^{th}$ environmental condition graphic 112(11) being exposed whereas other sensor data indicating that the item reaches the "Cold Threshold 2" of 32°, or lower, may result in the $12^{th}$ environmental condition graphic 112(12) being exposed.

Figure 4A:
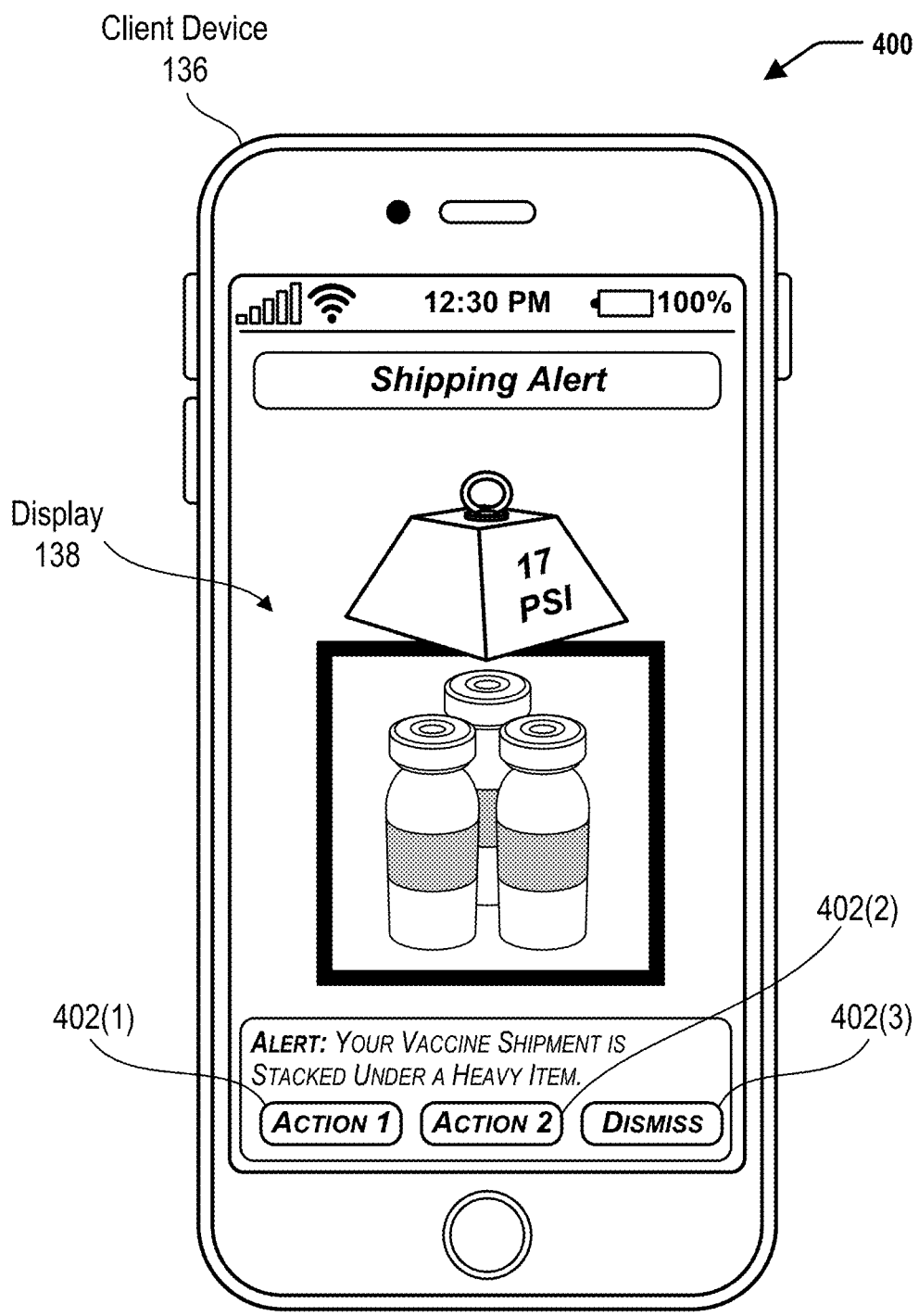
FIG. 4A illustrates an exemplary visualization that graphically represents an item being exposed to a potentially harmful environmental condition.

As further illustrated, the resistance data defines two different thresholds for exposure to hot temperatures. Specifically, the resistance data 108 defines a "Heat Threshold 1" of 80° F. that corresponds to the item being exposed to a degree of heat that puts the item at risk of becoming non-viable. The resistance data 108 further defines a "Heat Threshold 2" of 100° F. that corresponds to the item being exposed to a more extreme degree of heat that will actually result in the item becoming non-viable. It should be appreciated therefore while implementing the techniques described herein, sensor data indicating that the item has reached the "heat Threshold 1" of 80° F. may result in the $9^{th}$ environmental condition graphic 112(9) being exposed whereas other sensor data indicating that the item reaches the "Heat Threshold 2" of 100°, or higher, may result in the $10^{th}$ environmental condition graphic 112(10) being exposed Turning now to FIG. 4A, illustrated is an exemplary visualization 400 that graphically represents an item 124 being exposed to potentially harmful environmental conditions. In the specifically illustrated embodiment, the visualization 400 is generated by compositing the product graphic 106 that is shown in FIG. 3A with the second environmental condition graphic 112(2) shown in FIG. 2A that is usable to graphically represent an item being subjected to a second degree of pressure. Specifically, in the exemplary visualization 400, the product graphic 106 shown in FIG. 3A is inserted directly into the positional reference box shown in FIG. 2A within the second environmental condition graphic 112(2). Thus, the exemplary visualization 400 is generated to graphically represent the set of vials containing the vaccine being subjected to a potentially harmful degree of pressure.

In some embodiments, the visualization 400 may include an indication of a measurement taken by one or more sensors 126. For example, as illustrated, the visualization 400 includes an indication that the pressure transducer sensor has received a reading of 17 PSI—which thus satisfies the "Pressure Threshold 2" of 15 PSI shown in FIG. 3A.

In some embodiments, the visualization 400 may provide various user interface elements 402 that are selectable to cause various actions to be performed. As illustrated, for example, the visualization 400 contains an alert portion that states "Your Vaccine Shipment is Stacked Under a Heavy Item" and provides the user with three different user interface elements, labeled 402(1) through 402(3), that are individually selectable to cause various actions to be performed. As described above in relation to the smart contract 120, exemplary actions include returning the package to the sender, requesting an en route inspection of the package, or dismissing the alert.

Figure 4B:
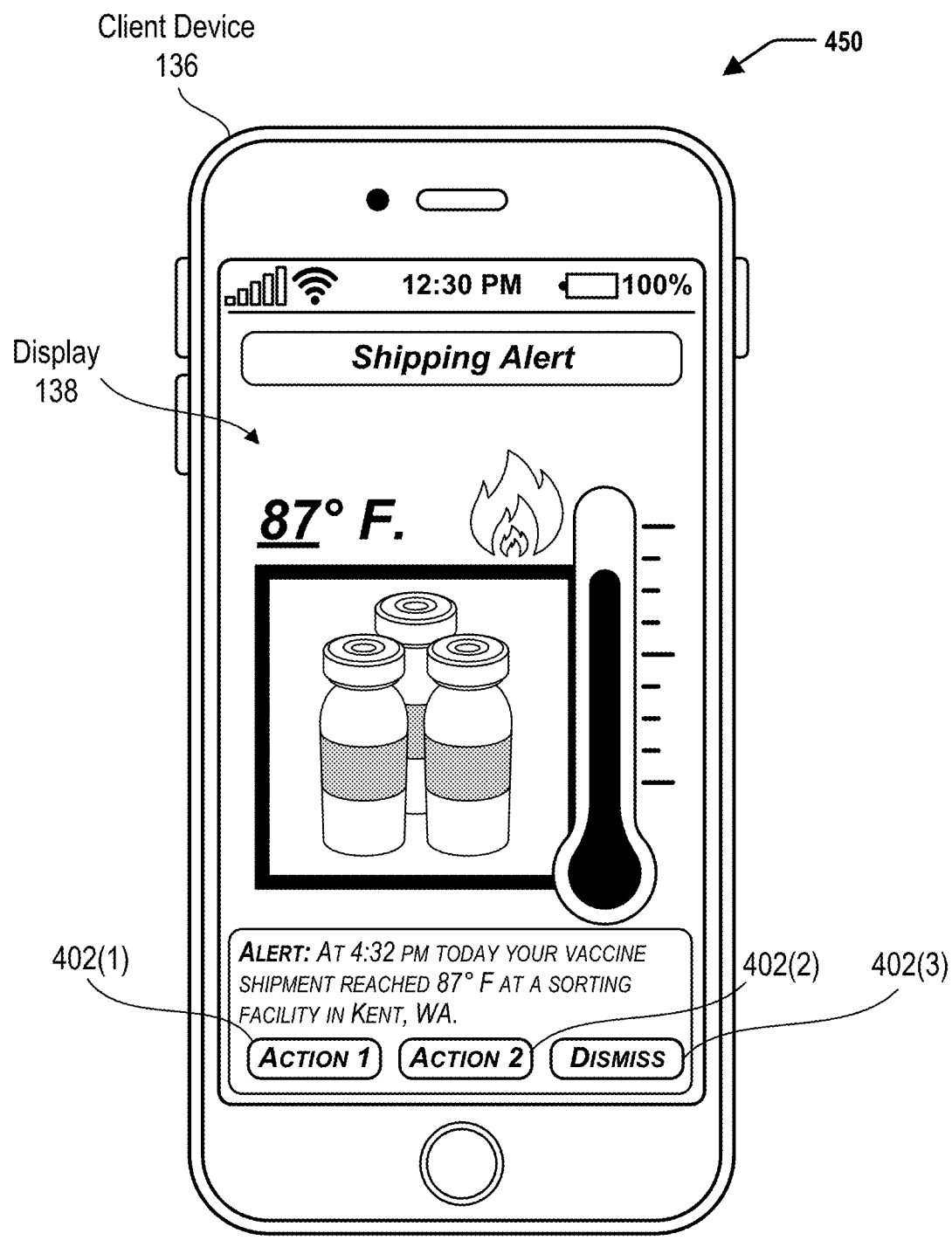
FIG. 4B illustrates another exemplary visualization that graphically represents an item being exposed to another potentially harmful environmental condition.

Turning now to FIG. 4B, illustrated is another exemplary visualization 450 that graphically represents an item 124 being exposed to potentially harmful environmental conditions. In the specifically illustrated embodiment, the visualization 450 is generated by compositing the product graphic 106 that is shown in FIG. 3A directly into the positional reference of the eighth environmental condition graphic 112(8) that is usable to graphically represent an item 124 being subjected to an upper temperature-threshold. Thus, the exemplary visualization 450 is generated to graphically represent the set of vials containing the vaccine being subjected to a potentially harmful degree of heat. As illustrated, the visualization 450 includes an indication that a temperature probe (e.g., a thermocouple) has received a reading of 87° Fahrenheit—which thus satisfies the "Temperature Threshold 2" of 80° Fahrenheit shown in FIG. 3A.

In some embodiments, a visualization may indicate a time at which a significant event has occurred such as, for example, a threshold being reached in association with a particular environmental condition. Additionally, or alternatively, a visualization may indicate a geographic location at which a significant event has occurred. For example, in the illustrated embodiment the visualization 450 includes text that states "Alert: At 4:32 pm today your vaccine shipment reached 87° F. at a sorting facility in Kent, WA."

Figure 5A:
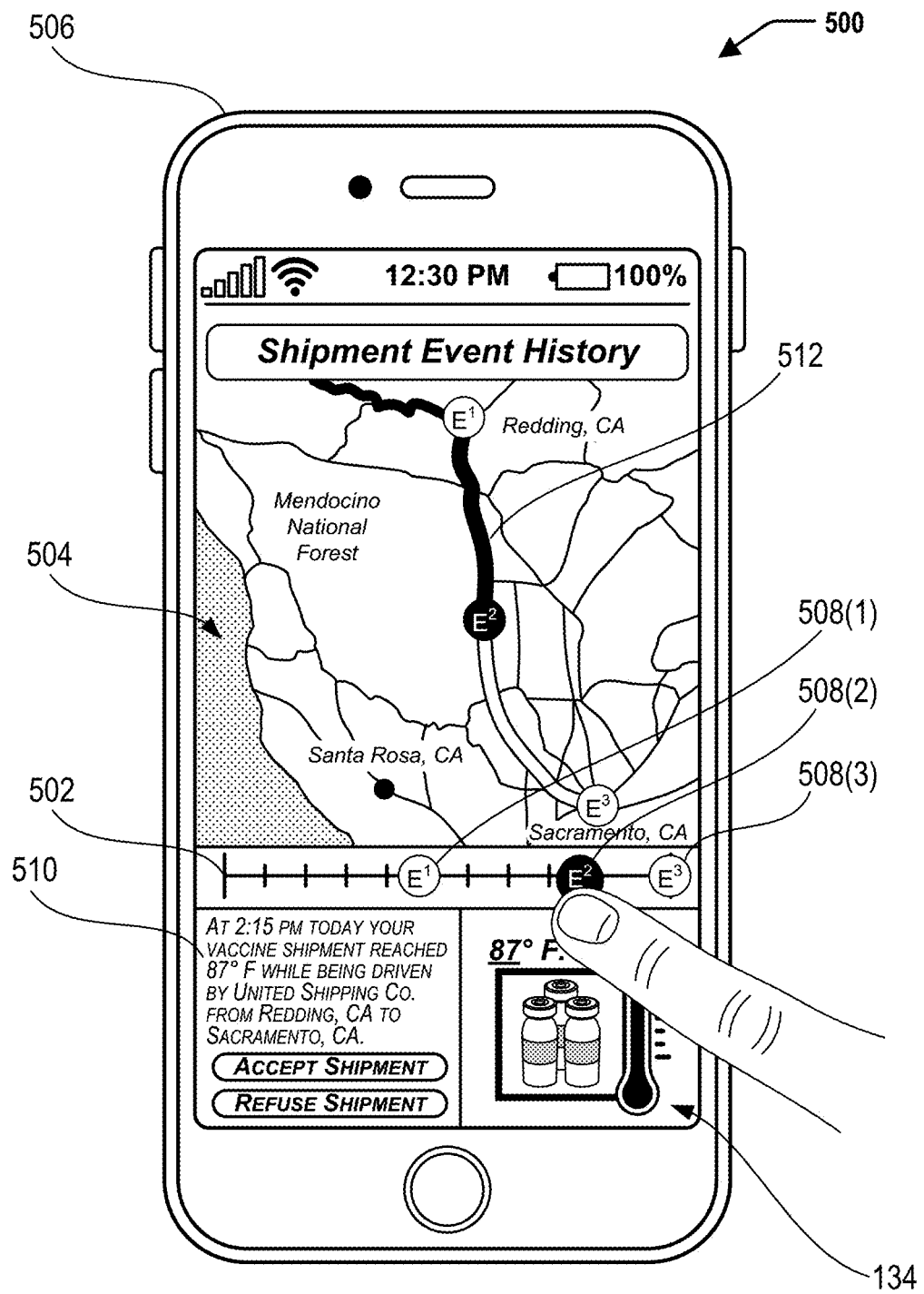
FIG. 5A illustrates an exemplary user interface that includes a timeline that enables a user to scroll through one or more significant shipping events that occurred while an item is en route to a destination location.

Turning now to FIG. 5A, illustrated is an exemplary user interface 500 that includes a timeline 502 that enables a user to scroll through one or more significant shipping events that occurred while an item is en route to a destination location. In the specifically illustrated embodiment, the exemplary user interface 500 is being rendered on a touch screen 504 of a client device 506 and a user is shown to be touching (and thereby selecting) a second user input element 508(2) that corresponds to a second significant shipping event "$E^2$" that occurred while the item was being transported. Upon selection of the second user input element 508(2) on the timeline 502, the client device 506 displays information associated with the second significant shipping event. Similarly, if the user selects the first user input element 508(1) on the timeline 502, then information associated with a first significant shipping event will be displayed.

In some embodiments, the information that is displayed in association with a significant shipping event may include a visualization 134 that graphically represents the item being subjected to a particular environmental condition. For example, as illustrated, a visualization 134 is being concurrently rendered that graphically represents the item (e.g., the vials of vaccine) being subjected to excess heat—i.e., heat above the upper temperature-threshold as defined in the resistance data 108. Additionally, or alternatively, the information that is displayed in association with a significant shipping event may include a textual description 510 of the significant event. An exemplary textual description 510 may include, but is not limited to, an indication of a time that a significant event occurred, a description of which environmental condition threshold(s) were breached, an indication of which specific entity had custody of the item when the significant event occurred, and/or a location at which the significant event occurred. For example, in the illustrated embodiment the textual description 510 of the second significant event states "At 2:15 pm today your vaccine shipment reached 87° F. while being driven by United Shipping Co. from Redding, CA to Sacramento, CA."

The exemplary user interface 500 may be in the form of an animation that can be dynamically changed by moving a control element along the timeline 502. For example, a scroll bar may be shown below an animation screen portion of the exemplary user interface 500. In the illustrated embodiment, this animation screen portion corresponds to the region of the touch screen 504 that is rendering a map and the route 512 along which the item has traveled (or is traveling) to the destination location. In such an embodiment, as an interested party manipulates the timeline 502, an animated clip may visually represent various significant events that occurred to the package while en route from an origination location 128 to a destination location 130. The animated clip may represent the distance that the package has traveled between significant events. In some embodiments, the animation may show points in time and locations at which the package was handed off between senders, one or more couriers, and/or a recipient of the package.

As a specific but non-limiting example, a visualization may include a timeline that begins when a package is passed off from a sender to a first courier and ends when the package is dropped off at a recipient's door. The user may open the package to discover that the item is slightly damaged. Then, the user may open an animation timeline visualization and manipulate a slider bar to view animation clips representing various significant events. For example, the user may pull the slider bar to a first portion of the timeline that corresponds to a point along the package's journey at which the package was dropped while being transferred from a first courier's vehicle to a second courier's vehicle. In response, an animation of a package being dropped may be shown to the user. Then, the user may manipulate the slider further to a second portion of the timeline that corresponds to a point along the package's journey at which the package was violently shaken in a manner consistent with being un-secured in a moving vehicle. In response, an animation of the package being jostled in a shaking moving truck may be shown to the user.

In some embodiments, event data that is generated while the package is en route to the destination location 130, but which falls below predetermined threshold readings may be discarded. In this way, storage space may be saved since data that does not represent significant events may be discarded.

Figure 5B:
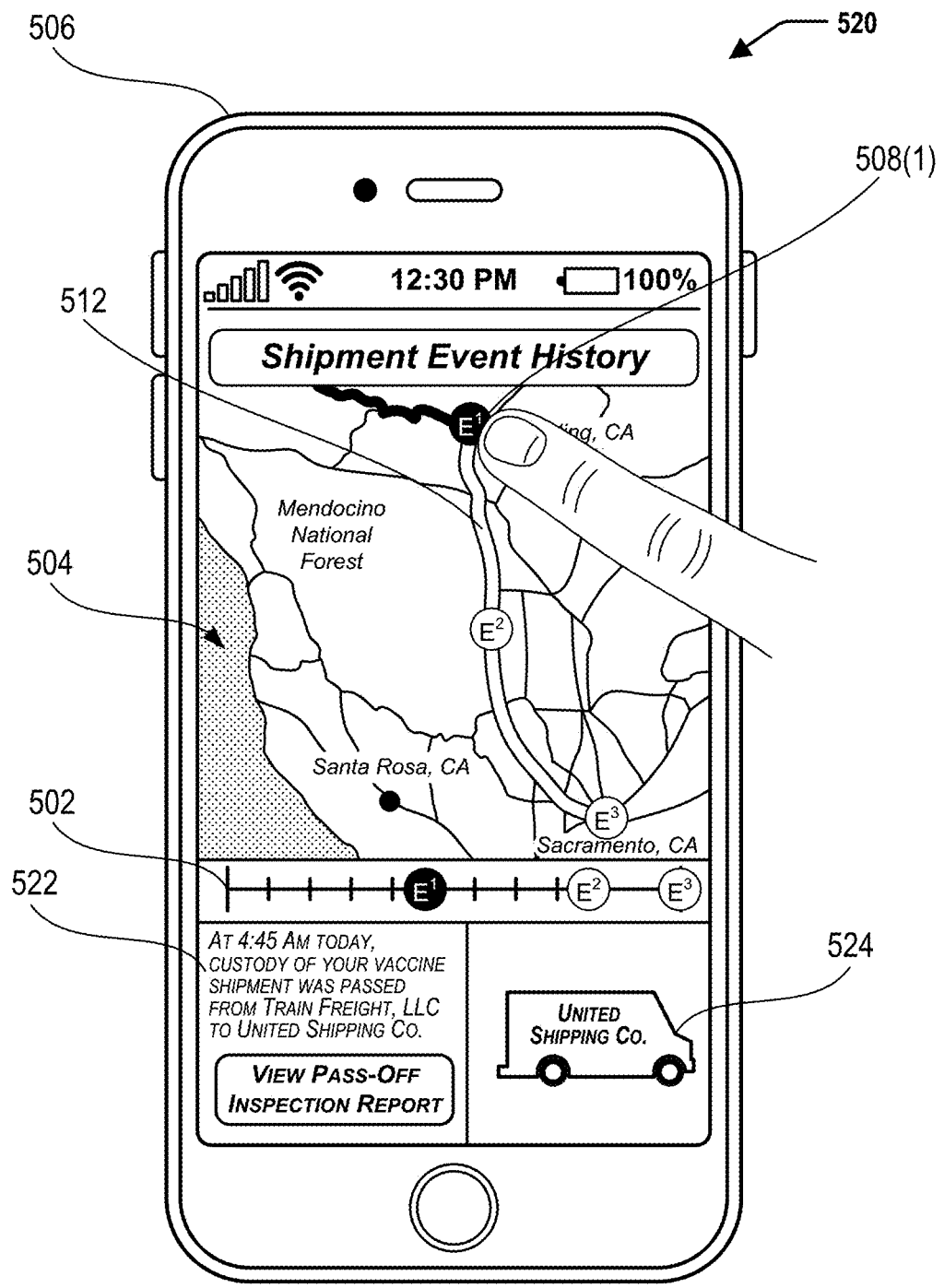
FIG. 5B illustrates an exemplary user interface that includes a location route that enables a user to scroll through the route being taken by the item from an origination location to a destination location.

Turning now to FIG. 5B, illustrated is another exemplary user interface 520 that is rendered in response to a user selecting another significant event directly from the route 512 that is shown directly over the map. FIG. 5B differs from FIG. 5A, in that the user is shown to be touching (and thereby selecting) a first user input element 508(1) that corresponds to a first significant shipping event "E¹" that occurred while the item was being transported. Responsive to this user selection, the client device 506 transitions from rendering the user interface 500 to rendering the user interface 520. In the illustrated embodiment, the first user input element 508(1) that is shown as being selected in FIG. 5B is selectable to perform similar functionality to the first user input element 508(1) that is labeled on the timeline 502 in FIG. 5A. It should be appreciated therefore that in some embodiments, the user is able to navigate thorough viewing information associated with different significant events by interacting with the timeline 502 or, alternatively, by interacting directly with the shipping route that is displayed over the map.

As illustrated, the first significant event corresponds to a change in custody of the item from a first entity to a second entity. In some embodiments, the user interface 520 may include a textual description 522 that indicates whom custody was transferred between. For example, in the illustrated embodiment the textual description 522 of the first significant event states "At 4:45 Am today, custody of your vaccine shipment was passed from Train Freight, LLC to United Shipping Co." In some embodiments, the user interface 520 may include a graphical element 524 that is graphically representative of a carrier entity having custody of the item 124 at the time of and/or subsequent to a significant event. For example, as illustrated, the user interface 520 includes a graphical element 524 that is representative of a delivery van and includes a name of the carrier entity superimposed over the delivery van. In this way, interested parties may immediately recognize whom is responsible for various significant events that occur while the package is being transported.

Figure 5C:
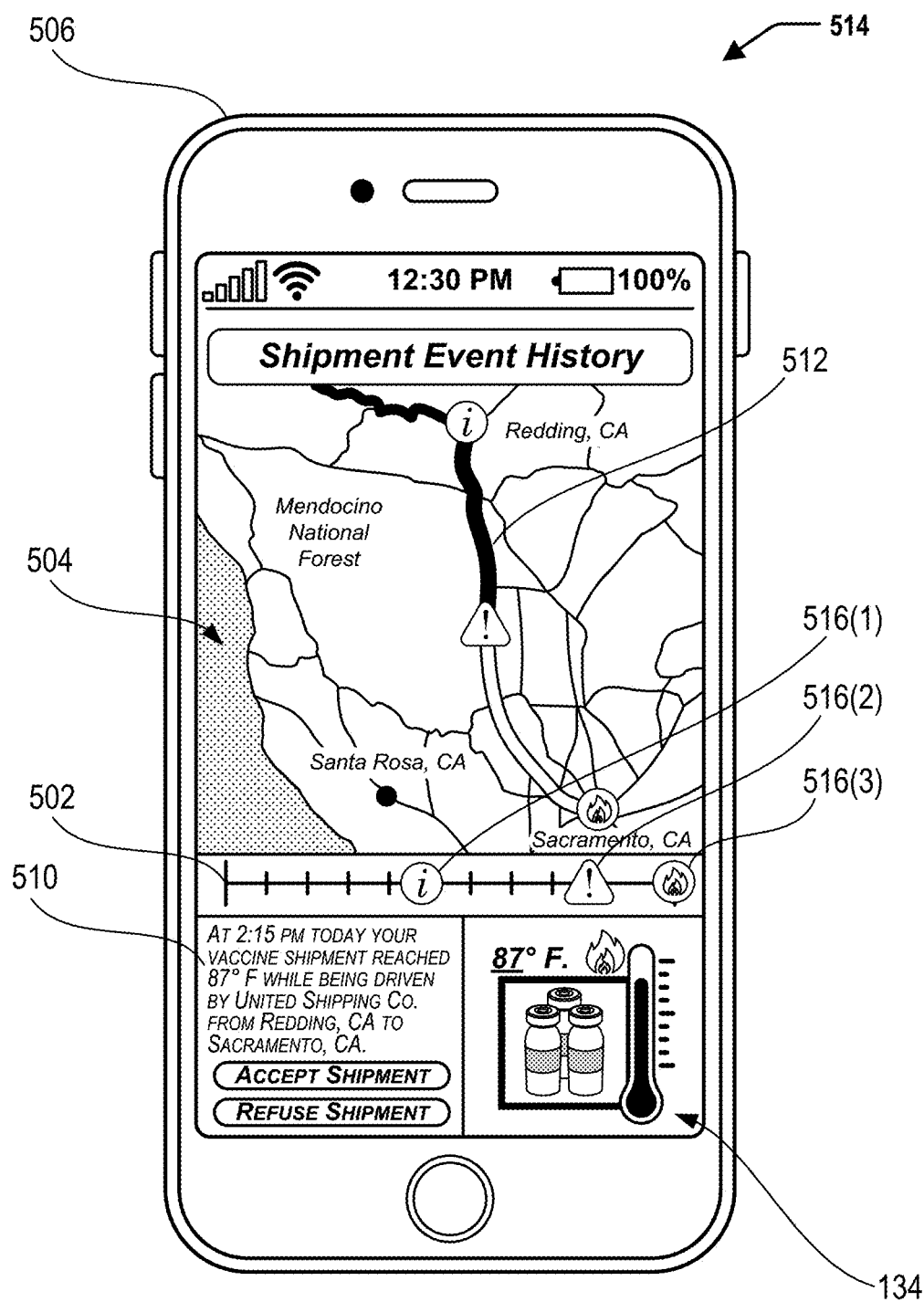
FIG. 5C illustrates an exemplary user interface that includes one or more icons that are indicative of different types of significant events occurring while an item is en route to a destination location.

Turning now to FIG. 5C, illustrated is another exemplary user interface 514 that includes one or more icons 516 that are indicative of different types of significant events occurring. By use of the different icons, users may be provided with a quick visual indicator as to whether any significant shipping events have occurred that may cause concern. In various embodiments, the icon 516 may be color coded to indicate a level of importance of the various significant events that occur while the item 124 is en route to the destination location. For example, an "informational" icon such the first icon 516(1) may be colored green to indicate that some event has occurred that does not relate to the item being exposed to threshold levels of environmental conditions. One such event could correspond to custody of the item changing from a first shipping company to another shipping company. As another example, a "warning" or "yield" icon such as the second icon 516(2) may be colored yellow to indicate that some warning threshold was reached such that the item is at risk of becoming damaged if the exposure continues and/or worsens. As yet another example, an "exclamation" or "damage" icon such as the third icon 516(3) may be colored red to indicate that some catastrophic damage threshold has been reached indicating that the item has most likely and/or certainly become non-viable (e.g., irreversibly damaged). Furthermore, as illustrated, the "exclamation" or "damage" icon may be indicative of the type of damage that has occurred. For example, as illustrated, the third icon 516(3) is shown as including a fire icon to indicate that the item has been damaged by heat.

Figure 6:
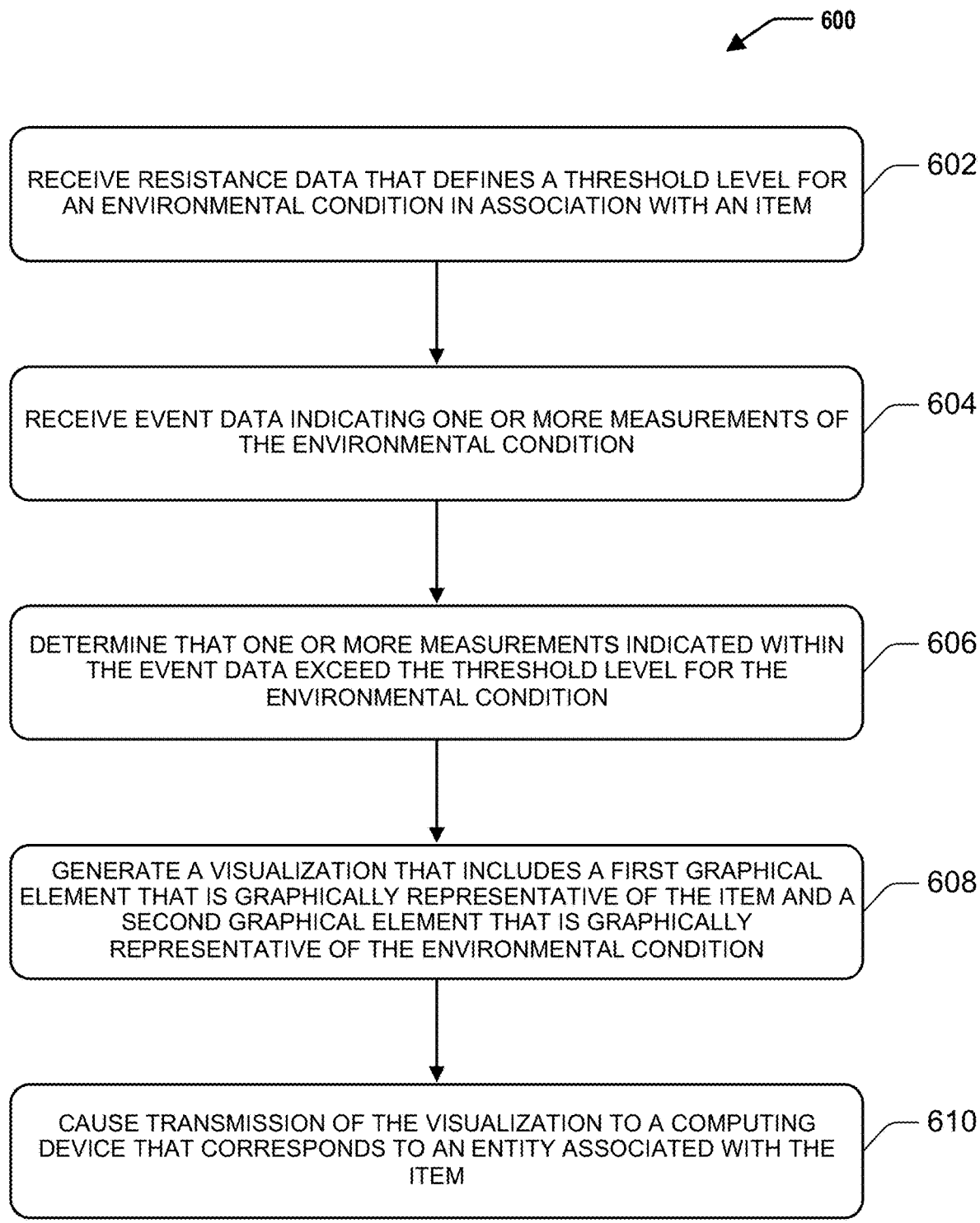
FIG. 6 illustrates an example process of generating visualizations that graphically represent an item being exposed to extreme environmental conditions while en route to a destination location.

FIG. 6 is a flow diagram of an example process 600 which are described with reference to FIGS. 1-5. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

FIG. 6 illustrates an example process 600 of generating visualizations that graphically represent an item being exposed to extreme environmental conditions while en route to a destination location. An exemplary visualization may include a still graphic that shows a symbol of a detected environmental condition positioned adjacent to and/or superimposed over a graphic that represents the item. Another exemplary visualization may include an animation that includes a sequence of frames that, when sequentially displayed at a particular frame rate, animate the item being subjected to the detected environmental condition.

At block 602, a system may receive resistance data that defines a threshold level for an environmental condition in association with an item. The resistance data may define, for example, a lower temperature-threshold below which the item may become damaged and an upper temperature-threshold above which the item may become damaged. Thus, the resistance data may define an acceptable range for a particular environmental condition. Additionally, or alternatively, the resistance data may define multiple incrementally progressive degrees for a particular environmental condition—where the item being exposed to the incrementally progressive degrees results in an increased likelihood of damage to the item. For example, the resistance data may define a first degree of pressure and a second degree of pressure—where the item being exposed to the first degree of pressure may potentially cause damage to the item but the item being exposed to the second degree of pressure will certainly cause damage to the item.

At block 604, the system may receive event data indicating one or more measurements of the environmental condition. The event data may be received from a specific type of sensor that is usable to monitor the environmental condition. For example, under circumstances where the resistance data defines the lower and upper temperature-thresholds, the event data may be received from a thermocouple-type sensor. Additionally, or alternatively, under circumstances where the resistance data defines one or more degrees of pressure which may potentially and/or certainly damage the item, the event data may be received from a pressure transducer type sensor. As described above, the event data may be received by the system while the item is being transported from an origination location to a destination location.

At block 606, the system may determine that one or more measurements indicated within the event data exceed the threshold level for the environmental condition defined within the resistance data in association with the item. For example, the system may determine that a temperature reading is below the lower temperature threshold and/or that another temperature reading is above the upper temperature threshold.

At block 608, the system may generate a visualization that includes a first graphical element that is graphically representative of the item and a second graphical element that is graphically representative of the environmental condition for which the threshold level was exceeded. Furthermore, a positioning of the second graphical element with respect to the first graphical element may be indicative of the item having been subjected to a probability of damage resulting from the environmental condition. For example, as described in relation to FIG. 4B, the visualization may include a flame symbol that is positioned above, below, and/or superimposed at least partially over a digital image that represents the item.

In some embodiments, generating the visualization may include generating an animation that includes a plurality of frames that animate the first graphical element. For example, with particular reference to the fourth environmental condition graphic 112(4), compositing a digital image of the item into the positional reference of this specific environmental condition graphic will generate an animation of the item being dropped from a first height down to a second height at which it impacts a floor (illustrated as a thick black line) at which point the item will be animated as violently shaking, e.g. as a result of impacting the floor.

In some embodiments, an animation may be shown with respect to a timeline such as that shown in FIG. 5A to indicate various points in time at which the item has been subject to threshold levels of various environmental conditions. For example, a user may scroll his or her finger across the timeline 502 to view different visualizations and/or animations of significant events that have occurred with respect to the item while it is in transport from the origination location to the destination location.

In some implementations, the visualization may be graphically indicative of the item being subjected to a heightened probability of damage as a result of being exposed to a threshold level of an environmental condition at a specific portion of a shipping route. For example, as shown in FIG. 5A, an exemplary visualization may include a map that shows where an item was when specific significant events occurred with respect to the item such as, being exposed to too much heat and/or dropped and/or shaken during transport. Additionally, or alternatively, the visualization may include a graphical element (e.g., a textual description) that represents a carrier entity that had custody of the item when a significant event occurred. As a specific example and as shown in FIG. 5A, an exemplary visualization may include a textual description that states "At 2:15 pm today your vaccine shipment reached 87° F. while being driven by United Shipping Co. from Redding, CA to Sacramento, CA."

At block 610, the system may cause transmission of the visualization to a computing device that corresponds to an entity associated with the item. For example, after generating the visualization, the system may transmit the visualization to a smart phone computing device that is owned by a purchaser of the item. In this way, the purchaser may be informed in near real-time in a highly intuitive manner that the item that he or she has purchased has been neglected/damaged during transport. Furthermore, the purchaser may be given the option to take various actions such as, for example, requesting an en route inspection of the item and/or refusing delivery of the item.

Figure 7:
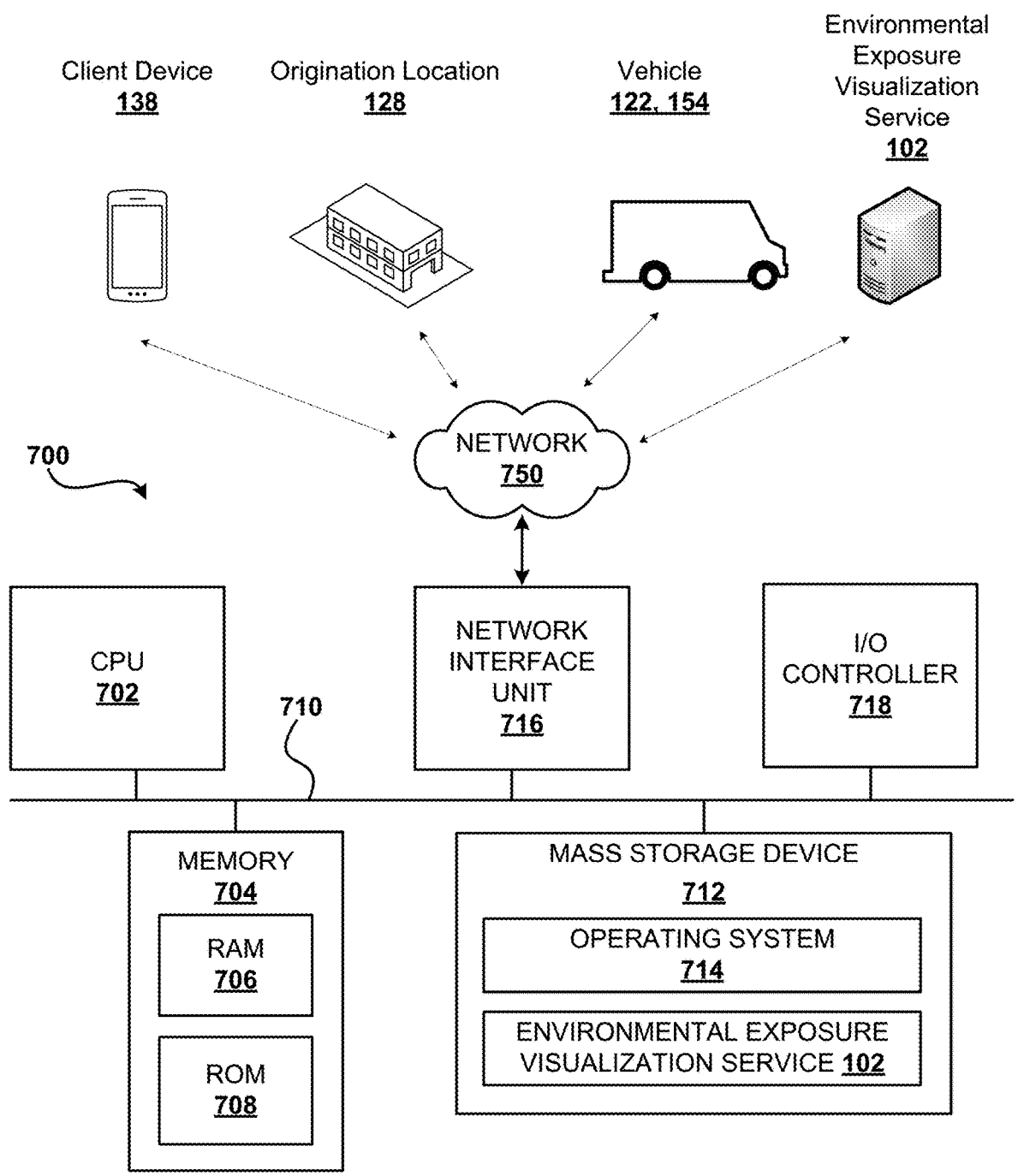
FIG. 7 shows additional details of an example computer architecture for a computer capable of executing the functionalities described herein such as, for example, those described with reference to the environmental exposure visualization service, or any program components thereof as described herein.

FIG. 7 shows additional details of an example computer architecture for a computer capable of executing the functionalities described herein such as, for example, those described with reference to the environmental exposure visualization service, or any program components thereof as described herein. Thus, the computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. The mass storage device 712 may further include the environmental exposure visualization service 102.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown in FIG. 7). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable the client device 136, the origination location 128, the vehicle 122, the vehicle 154, and/or the environmental exposure visualization service 102 to communicate with one another.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLES OF VARIOUS IMPLEMENTATIONS

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented method, comprising: receiving, from a sensor associated with an item, event data indicating one or more measurements of an environmental condition, wherein the event data that indicates the one or more measurements of the environmental condition is generated while the item is being transported from an origination location to a destination location; determining, based on resistance data that defines a threshold level for the environmental condition in association with the item, that at least some of the one or more measurements of the environmental condition exceed the threshold level for the environmental condition associated with the item; generating, based on the at least some of the one or more measurements exceeding the threshold level, a visualization that includes: a first graphical element that is graphically representative of the item, and a second graphical element that is graphically representative of the environmental condition, wherein a positioning of the second graphical element with respect to the first graphical element is indicative of the item being subjected to a probability of damage that results from the environmental condition; and causing transmission of the visualization to a computing device that corresponds to a predetermined entity associated with the item.

Clause 2: The computer-implemented method of Clause 1, wherein the visualization comprises an animation that includes a plurality of frames that animate the first graphical element with respect to the second graphical element to represent the item being subjected to the environmental condition.

Clause 3: The computer-implemented method of any one of Clauses 1 through 2, wherein the animation is shown with respect to a timeline that indicates one or more points in time at which the item has been subjected to the threshold level of the environmental condition.

Clause 4: The computer-implemented method of any one of Clauses 1 through 3, wherein the generating the visualization includes combining a visualization effect that corresponds to the environmental condition with the first graphical element that is graphically representative of the item.

Clause 5: The computer-implemented method of any one of Clauses 1 through 4, wherein the visualization effect includes a graphical representation of at least one of: the item being exposed to a pressure-threshold, the item being exposed to an acceleration-threshold, the item being exposed to a humidity-threshold, or the item being exposed to a temperature-threshold.

Clause 6: The computer-implemented method of any one of Clauses 1 through 5, wherein the visualization is graphically indicative of the item being subjected to the probability of damage based on exposure to the threshold level for the environmental condition at a specific portion of a shipping route from the origination location to the destination location.

Clause 7: The computer-implemented method of any one of Clauses 1 through 6, wherein the visualization further includes a third graphical element that is graphically representative of a carrier entity having custody of the item when the at least some of the one or more measurements of the environmental condition exceed the threshold level for the environmental condition associated with the item.

Clause 8: The computer-implemented method of any one of Clauses 1 through 7, further comprising causing at least some of the event data to be stored in a plurality of ledgers of a blockchain.

Clause 9: A system for generating visualizations that graphically represent an item being exposed to predetermined environmental conditions while en route to a destination location, the system comprising: one or more processors; and a memory in communication with the one or more processors, the memory having computer-readable instructions stored thereupon that, when executed by the one or more processors, cause the one or more processors to: receive product data associated with an item, wherein the product data defines a plurality of threshold levels for the item in association with one or more environmental conditions; receive event data that includes at least one sensor measurement for the one or more environmental conditions; determine, based on the event data, that a specific threshold level for the item has been exceeded in association with a specific environmental condition; generate a visualization by compositing a first graphical element that is graphically representative of the item into a positional reference of a second graphical element that is graphically representative of the specific environmental condition; and cause transmission of the visualization to a computing device that corresponds to a predetermined entity associated with the item.

Clause 10: The system of Clause 9, wherein the computer-readable instructions further cause the one or more processors to select the second graphical element that is graphically representative of the specific environmental condition in response to determining that the specific threshold level for the item has been exceeded in association with a specific environmental condition.

Clause 11: The system of any one of Clauses 9 through 10, wherein the visualization is graphically indicative of the item being exposed to the specific environmental condition at a specific portion of a shipping route from the origination location to the destination location.

Clause 12: The system of any one of Clauses 9 through 11, wherein the plurality of threshold levels include at least one of: a pressure-threshold, an acceleration-threshold, a humidity-threshold, or a temperature-threshold.

Clause 13: The system of any one of Clauses 9 through 12, wherein the first graphical element that is graphically representative of the item is a digital image that corresponds to a listing of the item.

Clause 14: The system of any one of Clauses 9 through 13, wherein the product data further includes the first graphical element that is graphically representative of the item.

Clause 15: The system of any one of Clauses 9 through 14, wherein the computer-readable instructions further cause the one or more processors to cause at least some of the event data to be stored in a plurality of ledgers of a blockchain.

Clause 16: A computer-readable storage medium having computer-executable instructions stored thereupon which, when executed by the processor, cause the processor to: receive resistance data, associated with an item, that defines a threshold level for an environmental condition; receive, from a sensor, event data indicating one or more measurements of the environmental condition that are obtained while the item is being transported from an origination location to a destination location; determine that at least some of the one or more measurements of the environmental condition exceed the threshold level; in response to the at least some of the one or more measurements exceeding the threshold level, cause transmission of a visualization to a computing device that corresponds to a predetermined entity associated with the item, wherein the visualization includes a first graphical element that is graphically representative of the item, and a second graphical element that is graphically representative of the environmental condition.

Clause 17: The computer-readable storage medium of Clause 16, wherein the computer readable storage medium has further computer-executable instructions stored thereupon to generate the visualization by compositing the first graphical element that is graphically representative of the item into a positional reference of the second graphical element that is graphically representative of the environmental condition.

Clause 18: The computer-readable storage medium of any one of Clauses 16 through 17, wherein the visualization includes a timeline that indicates one or more points in time at which the item has been subjected to the threshold level of the environmental condition.

Clause 19: The computer-readable storage medium of any one of Clauses 16 through 18, wherein the visualization comprises an animation that includes a plurality of frames that animate the item being subjected to the environmental condition.

Clause 20: The computer-readable storage medium of any one of Clauses 16 through 19, wherein the threshold level is a pressure-threshold, an acceleration-threshold, a humidity-threshold, or a temperature-threshold.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
  receiving, from sensors associated with an item, event data indicating measurements of environmental conditions, the measurements of the environmental conditions being generated while the item is being transported from an origination location to a destination location;
  determining, by a processor and based on resistance data that defines a plurality of threshold levels for the environmental conditions in association with the item, that one or more of the measurements exceed at least one of a first threshold level or a second threshold level for a specific environmental condition associated with the item;
  generating, based on the one or more measurements exceeding at least one of the first threshold level or the second threshold level, a visualization that includes:
    a first graphical element that is graphically representative of the item,
    a second graphical element that is graphically representative of the specific environmental condition, the second graphical element comprising a first graphic indicating that the item is at risk of becoming damaged based on the one or more measurements exceeding only the first threshold level, the second graphical element comprising a second graphic indicating that the item has been damaged based on the one or more measurements exceeding both the first threshold level and the second threshold level, and
    an animation of a plurality of frames that, when displayed sequentially, animate the first graphical element moving within the visualization in relation to the second graphical element to represent the item being subjected to the specific environmental condition; and
  automatically transmitting, by the processor and via a network, the visualization to a computing device that corresponds to a predetermined entity associated with the item responsive to the first threshold level or the second threshold level being exceeded, thereby causing the computing device to render the visualization on a display screen of the computing device.

2. The computer-implemented method of claim 1, wherein the animation is shown with respect to a timeline that indicates one or more points in time at which the item has been subjected to the first threshold level and the second threshold level for the specific environmental condition.

3. The computer-implemented method of claim 1, wherein the animation includes a graphical representation of at least one of:
  the item being exposed to a pressure-threshold,
  the item being exposed to an acceleration-threshold,
  the item being exposed to a humidity-threshold, or
  the item being exposed to a temperature-threshold.

4. The computer-implemented method of claim 1, wherein the visualization further includes a third graphical element that is graphically representative of a carrier entity having custody of the item when the one or more measurements exceed the first threshold level or the second threshold level for the specific environmental condition associated with the item.

5. The computer-implemented method of claim 1, further comprising:
  causing a first set of the event data that includes the one or more measurements that exceed the first threshold level or the second threshold level to be stored in a plurality of ledgers of a blockchain; and
  discarding a second set of the event data that includes the measurements of the environmental conditions which fall below the first threshold level or the second threshold level.

6. A system for generating visualizations that graphically represent an item being exposed to predetermined environmental conditions while en route to a destination location, the system comprising:
  one or more processors; and
  a memory in communication with the one or more processors, the memory having computer-readable instructions stored thereupon that, when executed by the one or more processors, cause the one or more processors to:
    receive product data associated with the item, wherein the product data defines a plurality of threshold levels for the item in association with multiple environmental conditions;

receive event data that includes sensor measurements for the multiple environmental conditions;

determine, based on the event data, that the sensor measurements exceed at least one threshold level of the plurality of threshold levels for a specific environmental condition associated with the item;

generate a visualization by compositing a digital image of the item obtained from an item listing of an online retailer from which the item was purchased into a positional reference of a graphical element that is graphically representative of the specific environmental condition, the visualization including an animation of a plurality of frames that, when displayed sequentially, animate the digital image of the item moving within the visualization in relation to the graphical element to represent the item being subjected to the specific environmental condition; and automatically transmit, over a network, the visualization to a computing device that corresponds to a predetermined entity associated with the item responsive to the at least one threshold level being exceeded, thereby causing the computing device to render the visualization on a display screen of the computing device.

7. The system of claim 6, wherein the computer-readable instructions further cause the one or more processors to select the graphical element that is graphically representative of the specific environmental condition in response to determining that the at least one threshold level for the specific environmental condition has been exceeded.

8. A computer-readable storage medium having computer-executable instructions stored thereupon which, when executed by a processor, cause the processor to:

receive resistance data, associated with an item, that defines a plurality of threshold levels for environmental conditions;

receive, from sensors associated with the item, event data indicating measurements of the environmental conditions that are obtained while the item is being transported from an origination location to a destination location;

determine that one or more of the measurements exceed at least one of a first threshold level or a second threshold level for a specific environmental condition associated with the item; and in response to the one or more measurements exceeding at least one of the first threshold level or the second threshold level, automatically transmit a visualization over a network to a computing device that corresponds to a predetermined entity associated with the item, the visualization including:

a first graphical element that is graphically representative of the item, a second graphical element that is graphically representative of the specific environmental condition, the second graphical element comprising a first graphic indicating that the item is at risk of becoming damaged based on the one or more measurements exceeding only the first threshold level, the second graphical element comprising a second graphic indicating that the item has been damaged based on the one or more measurements exceeding both the first threshold level and the second threshold level, and an animation of a plurality of frames that, when displayed sequentially, animate the first graphical element moving within the visualization in relation to the second graphical element to represent the item being subjected to the specific environmental condition.

9. The computer-implemented method of claim 1, further comprising:

receiving, prior to the item being transported, a smart contract associated with the item, the smart contract being encoded with a shipping change and triggering criteria, the triggering criteria including a threshold level for the specific environmental condition associated with the item; and responsive to determining that the one or more measurements exceed the threshold level, including an action user interface element in the visualization that is selectable to initiate the shipping change while the item is being transported.

10. The computer-implemented method of claim 1, further comprising:

receiving, prior to the item being transported, a smart contract associated with the item, the smart contract being encoded with a price modification and triggering criteria, the triggering criteria including a threshold level for the specific environmental condition associated with the item; and responsive to determining that the one or more measurements exceed the threshold level, including an action user interface element in the visualization that is selectable to accept shipment of the item at a reduced price as modified by the price modification.

11. The computer-implemented method of claim 10, further comprising, responsive to determining that the one or more measurements exceed the threshold level, including an additional action user interface element in the visualization that is selectable to refuse shipment of the item.

12. The computer-implemented method of claim 1, wherein the visualization further includes a first user interface element that is selectable to refuse shipment of the item and a second user interface element that is selectable to accept shipment of the item, and wherein causing the computing device to render the visualization includes causing the computing device to display the animation including the first graphical element and the second graphical element, the first user interface element, and the second user interface element concurrently on the display screen of the computing device.

13. The system of claim 6, wherein the computer-readable instructions further cause the one or more processors to:

obtain the digital image from the item listing of the online retailer from which the item was purchased;

crop the digital image; and insert the cropped digital image into the positional reference.

14. The computer-implemented method of claim 1, further comprising sensing, by the sensors embedded within a packaging unit that includes the item, the measurements of the environmental conditions.

15. The computer-implemented method of claim 1, further comprising sensing, by the sensors affixed within a cargo area of a vehicle transporting the item, the measurements of the environmental conditions.

16. The computer-implemented method of claim 1, wherein the sensors include at least one of:

a pressure transducer sensor;

an accelerometer sensor;

a humidity sensor; or a temperature sensor.

17. The computer-implemented method of claim 1, wherein the visualization further includes a map that includes a shipping route from the origination location to the destination location and a third graphical element on the shipping route that indicates a particular portion of the shipping route at which the item was exposed to the first threshold level or the second threshold level of the specific environmental condition.

18. The computer-implemented method of claim 17, wherein the map includes:
- a first icon located at a first portion of the shipping route at which the item was exposed to the first threshold level of the specific environmental condition; and
- a second icon located at a second portion of the shipping route at which the item was exposed to the second threshold level of the specific environmental condition.

19. The computer-implemented method of claim 1, wherein the first graphical element is a digital image of the item obtained from an item listing of an online retailer form which the item was purchased.

20. The computer-readable storage medium of claim 8, wherein the visualization further includes a map that includes a shipping route from the origination location to the destination location and a third graphical element on the shipping route that indicates a particular portion of the shipping route at which the item was exposed to the first threshold level or the second threshold level of the specific environmental condition.

* * * * *